US008311056B2

(12) United States Patent
Kimura et al.

(10) Patent No.: US 8,311,056 B2
(45) Date of Patent: Nov. 13, 2012

(54) DEVICE AND METHOD FOR SELECTING TIME SLOTS BASED ON RESOURCE USE STATE

(75) Inventors: Masamichi Kimura, Tokyo (JP); Makoto Kawamichi, Tokyo (JP); Shuichi Iida, Tokyo (JP); Tomoshige Funasaki, Tokyo (JP)

(73) Assignee: NEC Corporation, Tokyo (JP)

( * ) Notice: Subject to any disclaimer, the term of this patent is extended or adjusted under 35 U.S.C. 154(b) by 516 days.

(21) Appl. No.: 12/171,439

(22) Filed: Jul. 11, 2008

(65) Prior Publication Data
US 2009/0016373 A1    Jan. 15, 2009

(30) Foreign Application Priority Data

Jul. 11, 2007   (JP) .................................. 2007-181582

(51) Int. Cl.
*H04L 12/43*      (2006.01)
(52) U.S. Cl. ........................................ 370/458; 709/226
(58) Field of Classification Search ........................ None
See application file for complete search history.

(56) References Cited

U.S. PATENT DOCUMENTS

| 6,205,154 B1* | 3/2001 | Schmidt et al. | 370/458 |
| 6,320,863 B1* | 11/2001 | Ramfelt | 370/404 |
| 2003/0147352 A1* | 8/2003 | Ishibashi et al. | 370/248 |
| 2006/0136233 A1* | 6/2006 | Takeda et al. | 705/1 |

FOREIGN PATENT DOCUMENTS

| JP | 2000269916 A | 9/2000 |
| JP | 2001358691 A | 12/2001 |
| JP | 2004179894 A | 6/2004 |
| JP | 2006352297 A | 12/2006 |

OTHER PUBLICATIONS

Japanese Office Action for JP2007-181582 issued Apr. 10, 2012.

* cited by examiner

*Primary Examiner* — Yemane Mesfin
*Assistant Examiner* — Khoa Huynh

(57) ABSTRACT

A time slot selection device is provided that can consider resource use states on its own and allocate time slots. The time slot selection device performs time slot allocation, based on data link identifiers that identify a group of data links specified by a path setup request, a time slot size that is information about a required band, and a required number that is the number of contiguous time slots required. In this time slot selection device, a resource allocation section performs time slot selection, based on the resource use state of each time slot. By the time slot selection with consideration given to the use state of each time slot in the group of data links, time slots to be used can be selected so that a maximum number of contiguous usable time slots will be left. Thus, it is possible to efficiently use resources.

17 Claims, 19 Drawing Sheets

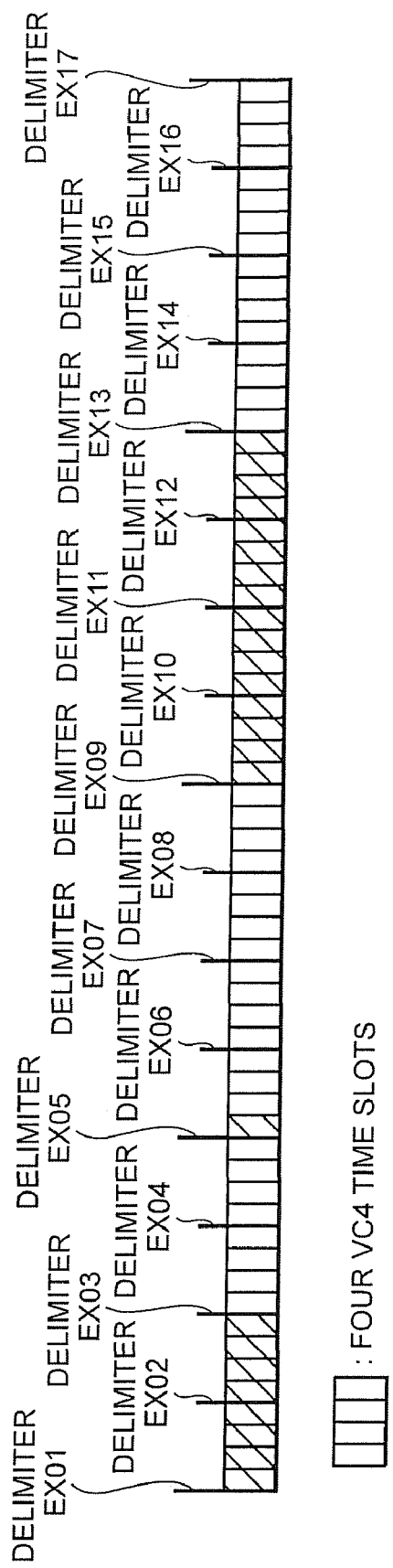
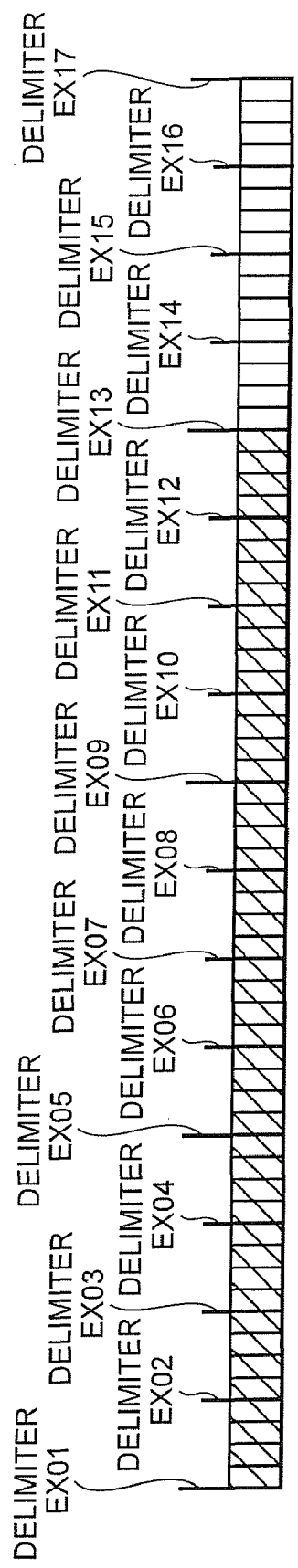

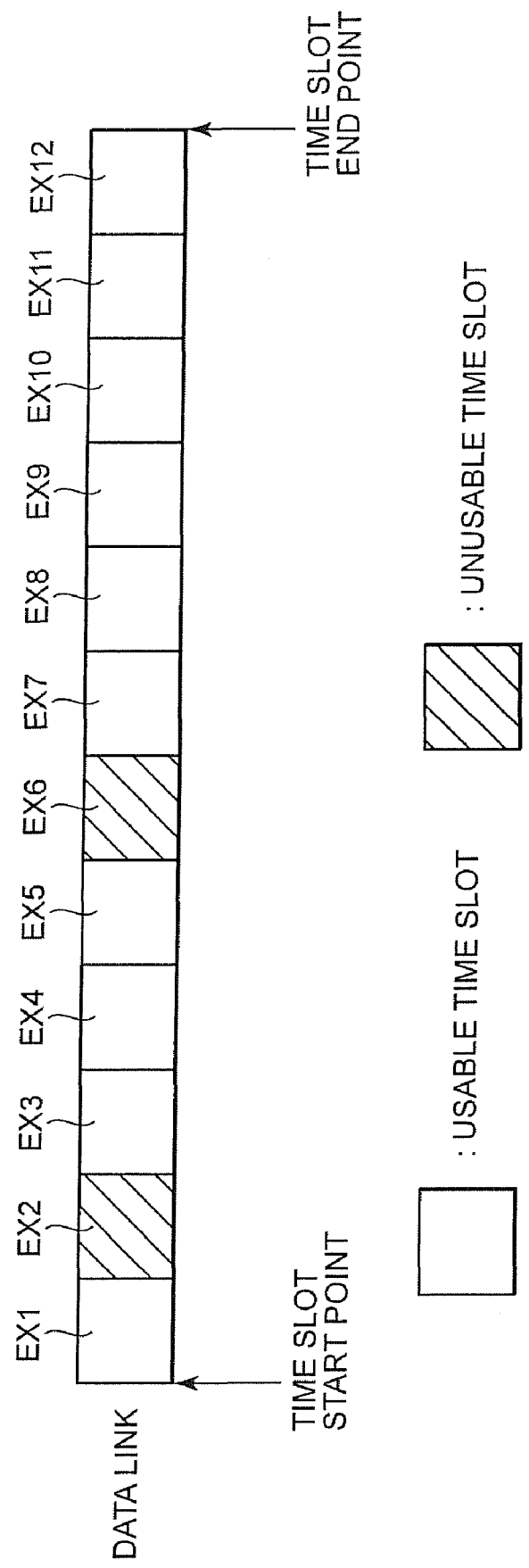

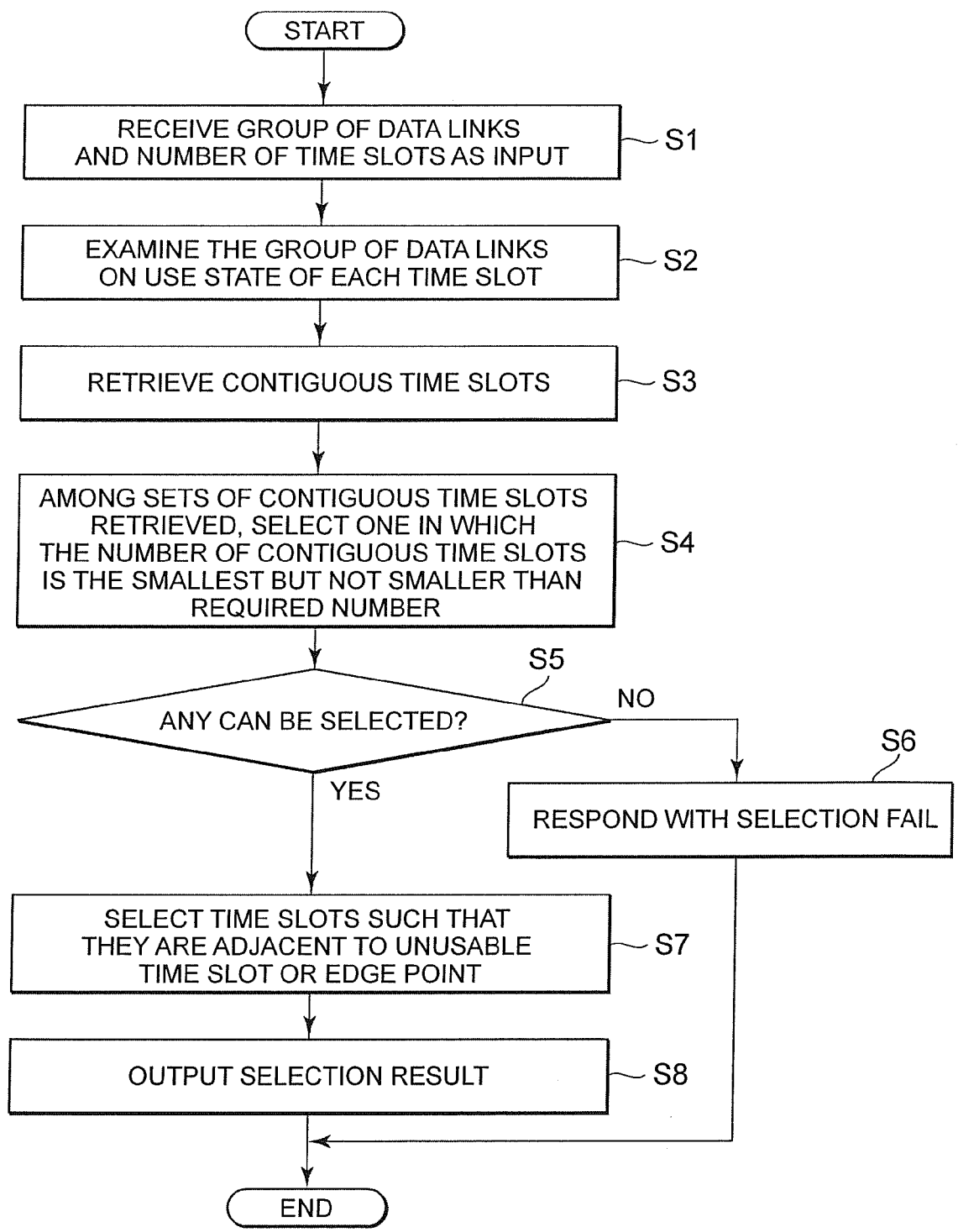

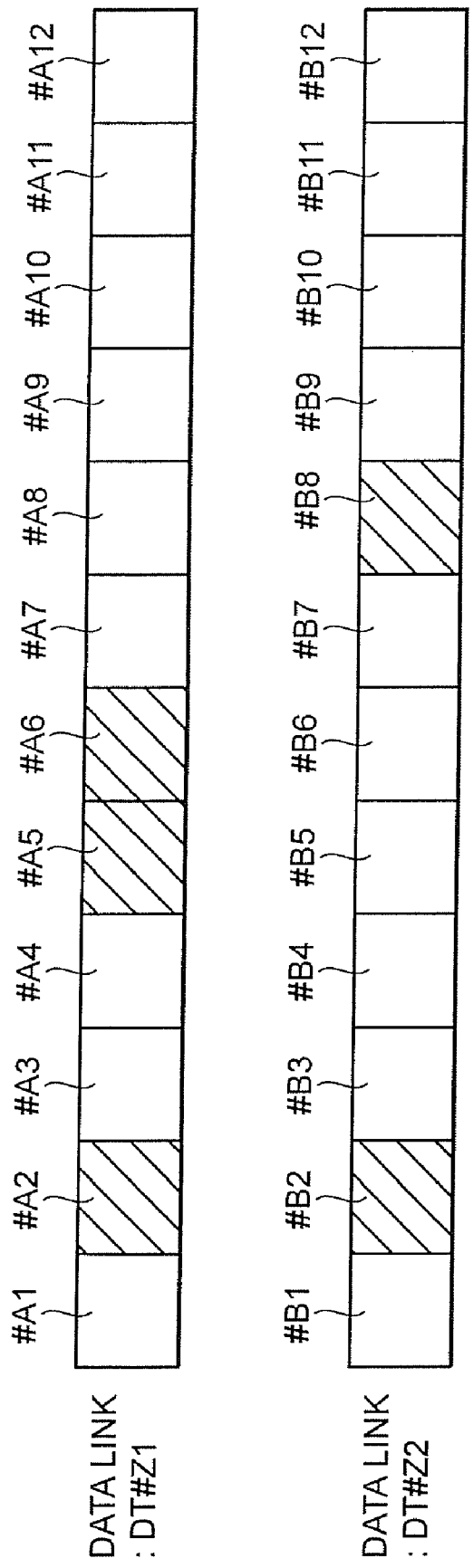

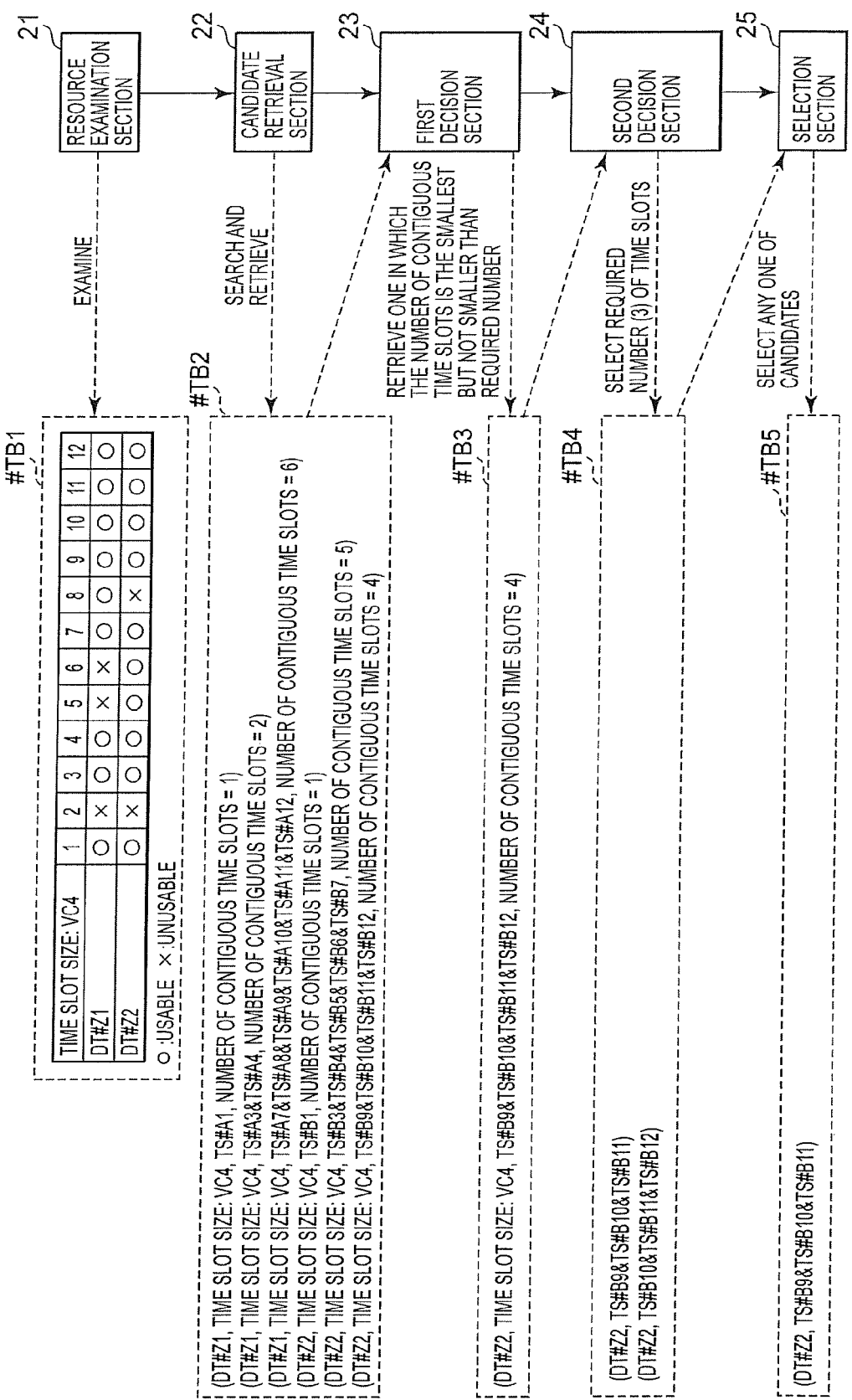

FIG. 13

| CANDIDATE TIME SLOTS (ALL IN DT#Z4) | NUMBER OF VC4-64c SEGMENTS TO BE CONSUMED | NUMBER OF VC4-16c SEGMENTS TO BE CONSUMED | NUMBER OF VC4-4c SEGMENTS TO BE CONSUMED |
|---|---|---|---|
| TIME SLOTS BETWEEN DELIMITERS 304 AND 309 | 0 | 1 | 5 |
| TIME SLOTS BETWEEN DELIMITERS 305 AND 310 | 0 | 2 | 5 |
| TIME SLOTS BETWEEN DELIMITERS 306 AND 311 | 0 | 2 | 5 |
| TIME SLOTS BETWEEN DELIMITERS 307 AND 312 | 0 | 2 | 5 |
| TIME SLOTS BETWEEN DELIMITERS 308 AND 313 | 0 | 2 | 5 |
| TIME SLOTS BETWEEN DELIMITERS 309 AND 314 | 0 | 2 | 5 |
| TIME SLOTS BETWEEN DELIMITERS 310 AND 315 | 0 | 2 | 5 |
| TIME SLOTS BETWEEN DELIMITERS 311 AND 316 | 0 | 2 | 5 |
| TIME SLOTS BETWEEN DELIMITERS 312 AND 317 | 0 | 2 | 5 |

DEVICE AND METHOD FOR SELECTING TIME SLOTS BASED ON RESOURCE USE STATE

INCORPORATION BY REFERENCE

This application is based upon and claims the benefit of priority from Japanese Patent Application No. 2007-181582, filed on Jul. 11, 2007, the disclosure of which is incorporated herein in its entirety by reference.

BACKGROUND OF THE INVENTION

1. Field of the Invention

The present invention relates to a time slot selection device, an optical transmission device, and an optical transmission network system, as well as a time slot selection method and program used in the time slot selection device. In particular, the present invention relates to a time slot selection method that takes consideration of the use states of resources in a time-division-multiplexing (TDM) optical transmission network system.

2. Description of the Related Art

In an optical transmission network, an operator manually sets a path. However, to achieve more efficient operation and more efficient use of network resources, it is regarded as a scheme of promise to set a path through an autonomous decentralized protocol (hereinafter referred to as ADP) such as generalized multi-protocol label switching (GMPLS) or an automatically switched optical network (ASON).

Here, setting a path (path setting) means reserving a time slot and/or wavelength along the route of a path that is desired to be set. A time slot or a wavelength is referred to as a label.

The path set through an ADP such as GMPLS/ASON has the advantages of easy path setting and good efficiency in the use of network resources because path setting is performed through autonomous decentralized processing. However, there is a drawback that it is difficult to set a path reflecting the intention of an operator.

In an autonomous decentralized network such as a GMPLS/ASON network, to use TDM time slots efficiently, a user, when requesting to set up a path, needs to check the use state of each time slot allocated between devices and designate time slots one by one.

Moreover, in a case where a path is set up by an autonomous decentralized system such as a GMPLS/ASON system without designation of time slots, selection of time slots is performed depending on information unrelated to resource use states, such as a data link identifier and the numerical magnitude of a time slot number, without taking consideration of the resource use states. As for GMPLS, see Japanese Patent Application Unexamined Publication Nos. 2006-352297 and 2004-179894.

According to a related-art optical transmission device, although it is possible to automatically allocate time slots, it is not considered to efficiently select time slots. Therefore, the problem arises that a user needs to designate time slots one by one while considering resource use states.

Moreover, according to a related-art optical transmission device, a user may set up a path including time slots designated through a network management system (NMS). However, in a case where a path is set up by a path setup means in an autonomous decentralized system such as a GMPLS/ASON system without time slots being designated, a time-slot selection scheme becomes device-dependent, causing the time slot selection to be inefficient.

SUMMARY OF THE INVENTION

Accordingly, an object of the present invention is to solve the above-described problems and to provide a time slot selection device and method that can achieve efficient allocation of time slots.

According to the present invention, a device for selecting time slots from a resource based on a path setup request including a data link identifier identifying at least one data link, a time slot size and a requested number of time slots, includes a resource allocation section for selecting the time slots based on a use state of the resource.

According to the present invention, a method for selecting time slots from a resource based on a path setup request including a data link identifier identifying at least one data link, a time slot size and a requested number of time slots, includes a) selecting the time slots based on a use state of the resource.

According to the present invention, a computer-readable program instructing a computer to select time slots from a resource based on a path setup request including a data link identifier identifying at least one data link, a time slot size and a requested number of time slots, includes a) selecting the time slots based on a use state of the resource.

According to the device and method as described above, it is possible to obtain the effect that time slots can be allocated with consideration given to resource use states at each device.

BRIEF DESCRIPTION OF THE DRAWINGS

FIG. 2A shows usable and unusable time slots when viewed on a basis of a time slot size of VC4 in the first exemplary embodiment.

FIG. 2B shows usable and unusable time slots when viewed on a basis of a time slot size of VC4-16c in the first exemplary embodiment.

FIG. 3 is a diagram showing an example of the structure of a data link in the first exemplary embodiment.

FIG. 4 is a flow chart showing operations of a resource allocation section shown in FIG. 1.

FIG. 5 is a diagram showing an example of a time slot structure in the first exemplary embodiment.

FIG. 6 is a diagram showing operations of the resource allocation section with respect to the time slot structure shown in FIG. 5.

FIG. 13 is a diagram showing groups of time slots that are selected as candidates by a fourth decision section shown in FIG. 7.

DETAILED DESCRIPTION OF THE PREFERRED EMBODIMENTS

Hereinafter, exemplary embodiments of the present invention will be described with reference to the accompanying drawings.

1. First Exemplary Embodiment 1.1) Device Structure

Figure 1:
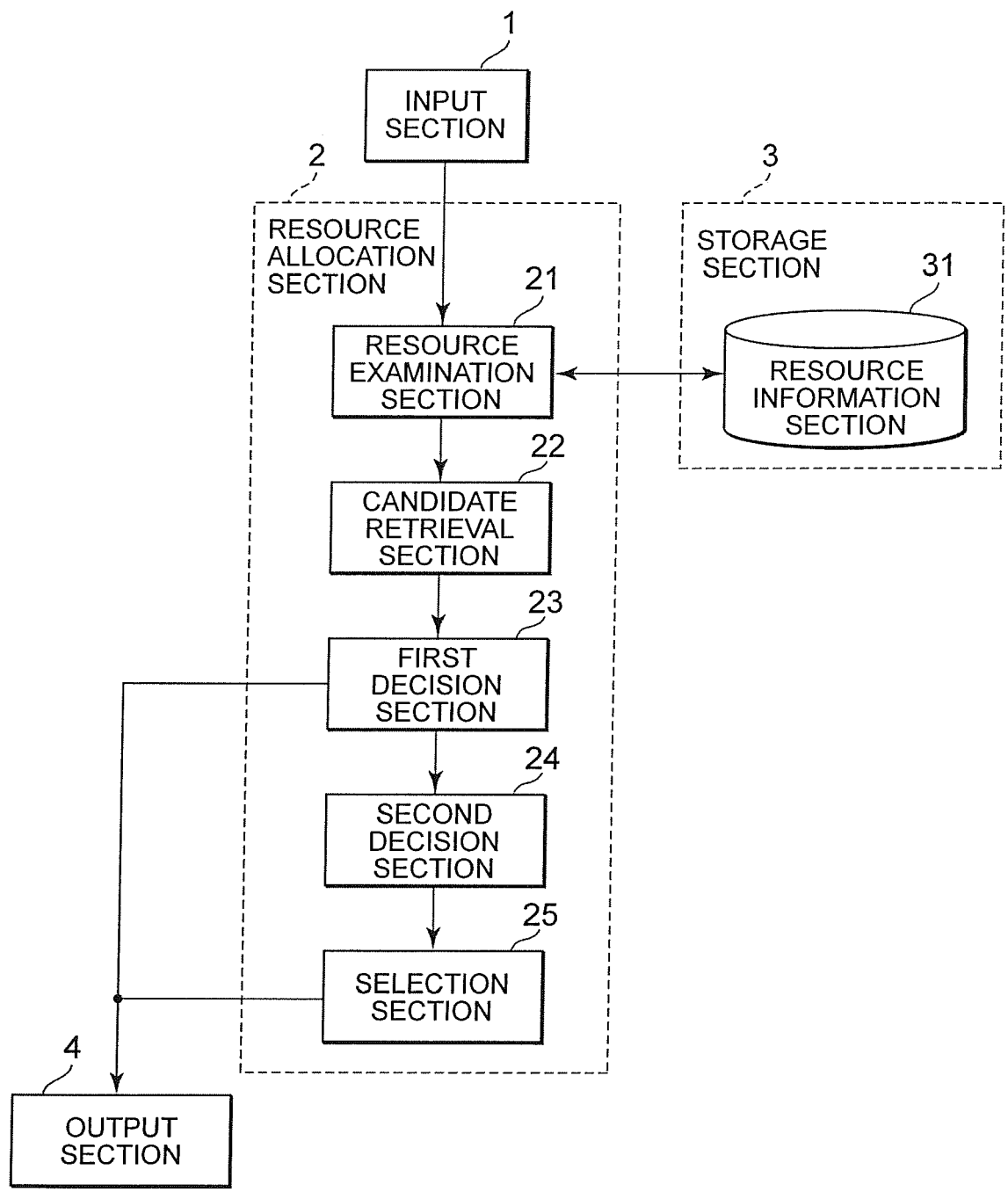
FIG. 1 is a block diagram showing an example of the configuration of a time slot selection device according to a first exemplary embodiment of the present invention.

FIG. 1 is a block diagram showing an example of the schematic structure of a time slot selection device according to a first exemplary embodiment of the present invention. According to the present exemplary embodiment time slots can be efficiently selected while taking consideration of the resource use states of TDM time slots in a TDM optical transmission device. Thereby, according to the present exemplary embodiment, when a path is to be set up, optimal resource allocation is carried out at each device even if time slots are not designated, whereby more efficient operation can be accomplished.

Referring to FIG. 1, the time slot selection device according to the first exemplary embodiment of the present invention includes an input section 1, a resource allocation section 2, a storage section 3, and an output section 4.

The input section 1 gives the resource allocation section 2 at least one data link identifier, a time slot size, and a required number. Here, the time slot size represents the unit size of a time slot. The required number represents the number of time slots requested by a request to set up a path. For example, when three contiguous VC4-4c time slots are requested by a path setup request, the time slot size is VC4-4c, and the required number is three.

The storage section 3 is provided with a resource information section 31. The resource information section 31 stores in advance resource information on data links, as to each time slot of each data link, by using a data link identifier as a key. The resource information includes resource use states, such as whether or not a time slot is in use for another service (a representation of whether each time slot is in use/unused, and the time slot size of each time slot that is already used for another path and is therefore unusable), and the total sum of the time slots of each data link including both usable and unusable time slots.

The resource allocation section 2 is provided with a resource examination section 21, a candidate retrieval section 22, a first decision section 23, a second decision section 24, and a selection section 25.

The resource examination section 21 refers to the resource information section 31 by using a data link identifier as a key and examines the data link in question on the usability/unusability of each time slot of a unit size, which has been given as the time slot size.

Based on information given from the resource examination section 21, the candidate retrieval section 22 searches the data link for a set of contiguous time slots as a candidate. Information about the retrieved contiguous time slots includes the data link identifier, the time slot size, time slot numbers, and the number of the contiguous time slots.

From among candidates (sets of such contiguous time slots) given from the candidate retrieval section 22, the first decision section 23 selects a first candidate which is a set of contiguous time slots the number of which is the smallest but not smaller than the required number. When there are no contiguous time slots the number of which is not smaller than the required number, the first decision section 23 determines that selection has failed, and gives a fail response to the output section 4.

From the first candidates (contiguous time slots) thus selected by the first decision section 23, the second decision section 24 finds, as a second candidate, time slots that meet the time slot size and required number and are adjacent to an unusable time slot (or an edge point). The selection section 25 gives the output section 4 any one of such second candidates given from the second decision section 24.

The output section 4 outputs the data link identifier and time slot numbers of the second candidate given from the selection section 25. If a fail response is given, the output section 4 determines that resource allocation meeting the path setup request has failed, and outputs a fail response.

1.2) Usable/Unusable Time Slots

FIGS. 2A and 2B are diagrams showing usable and unusable time slots in the first exemplary embodiment of the present invention. FIG. 2A shows the time slots when viewed on a basis of a time slot size of VC4, and FIG. 2B shows the time slots when viewed on a basis of a time slot size of VC4-16c. Usable and unusable time slots in the first exemplary embodiment of the present invention will be described with reference to FIGS. 2A and 2B.

When a time slot of a unit size that is a certain time slot size is being used even partly, this time slot is regarded as an unusable time slot. For example, in a case of a path setup request specifying that the time slot size is VC4-16c, when even one of the VC4 time slot segments in a time slot of a time slot size of VC4-16c is unusable, the time slot of a time slot size of VC4-16c is regarded as unusable.

It is assumed that, in FIGS. 2A and 2B, the minimum unit is a time slot size of VC4 and a data link includes 64 VC4 time slots. Here, when a request specifying that the time slot size is VC4-16c is made, since the time slots between the delimiters EX01 and EX03 are unusable, the segment between the delimiters EX01 and EX05 cannot be used as a time slot of a time slot size of VC4-16c.

Moreover, since one VC4 time slot is unusable between the delimiters EX05 and EX06, the segment between the delimiters EX05 and EX09 cannot be used as a time slot of a time slot size of VC4-16c.

Since all time slots between the delimiters EX09 and EX13 are unusable, the segment between the delimiters EX09 and EX13 cannot be used as a time slot of a time slot size of VC4-16c. The time slots between the delimiters EX13 and EX17 are usable. From these results, only the segment between the delimiters EX13 and EX17 can be used as a time slot of a time slot size of VC4-16c, and the time slots between the delimiters EX01 and EX13 are unusable (see FIG. 2B).

1.3) Contiguous Time Slots

FIG. 3 is a diagram showing an example of the structure of a data link in the first exemplary embodiment of the present invention. Contiguous time slots and the number of contiguous time slots in the first exemplary embodiment will be defined with reference to FIG. 3.

It is assumed that a time slot size of VC4 is requested and a data link includes 12 time slots as resources. Moreover, in FIG. 3, it is assumed the minimum unit is a time slot size of VC4 and that the time slots EX2 and EX6 are unusable and the time slots EX1, EX3 to EX5, and EX7 to EX12 are usable. Additionally, an edge point on the side having a smaller time slot number is referred to as a start point, and the other edge point on the side having a larger time slot number is referred to as an end point.

Here, the number of contiguous time slots of the 12 time slots is a number representing how many time slots can be contiguously secured between the start and end points of the 12 time slots without being interrupted by an unusable time slot. In FIG. 3, there are three sets of contiguous time slots.

Regarding the first set, beginning with the start point of the 12 time slots, it can be found that the time slot EX1 is usable and the time slot EX2 is unusable. Accordingly, since there is one contiguous usable time slot starting with the time slot EX1 and ending with the time slot EX1, the number of contiguous time slots is one.

Regarding the second set, the time slot EX2 is unusable, the time slots EX3, EX4, and EX5 are usable, and the time slot EX6 is unusable. Accordingly, since there are three contiguous usable time slots starting with the time slot EX3 and ending with the time slot EX5, the number of contiguous time slots is three.

Regarding the third set, the time slot EX6 is unusable, the time slots EX7 to EX12 are usable, and then comes the end point of the 12 time slots. Accordingly, since there are six contiguous usable time slots starting with the time slot EX7 and ending with the time slot EX12, the number of contiguous time slots is six.

In the case shown in FIG. 2A as another example, assuming that the time slot size is VC4-4c, there are contiguous time slots between the delimiters EX03 and EX05, and the number of the contiguous time slots is two. Moreover, there are contiguous time slots between the delimiters EX06 and EX09, and the number of the contiguous time slots is three. Further, there are contiguous time slots between the delimiters EX13 and EX17, and the number of the contiguous time slots is four.

1.4) Resource Allocation (Time Slot Selection)

FIG. 4 is a flow chart showing operations of the resource allocation section 2 shown in FIG. 1. Operations of the time slot selection device according to the first exemplary embodiment of the present invention will be described with reference to FIGS. 1 to 4. Note that the operations shown in FIG. 4 can be implemented by causing a CPU (not shown) to carry out the processing by the resource allocation section 2 through execution of a program stored in the storage section 3.

In a case where the TDM optical transmission device is an Ingress node, the TDM optical transmission device receives a path setup request from a network management system (NMS). In a case where the TDM optical transmission device is a Transit node or an Egress node, the TDM optical transmission device receives a path setup request from a neighboring node.

The input section 1 is given a plurality of data link identifiers, which identify a group of data links specified in the path setup request, a time slot size, which is information about a band required, and a required number, which is the number of contiguous time slots required.

When the data link identifiers, time slot size, and required number are supplied from the input section 1 (Step S1 in FIG. 4), the resource examination section 21 refers the data link identifiers to the resource information section 31 and examines, on a basis of the time slot size, the total number of time slots and the use state of each time slot (Step S2 in FIG. 4). The resource examination section 21 gives the results of this examination to the candidate retrieval section 22.

Based on the information given from the resource examination section 21, the candidate retrieval section 22 retrieves contiguous time slots (Step S3 in FIG. 4) and gives the first decision section 23 information about the contiguous time slots (the data link identifier, time slot size, time slot numbers, and number of the contiguous time slots).

From sets of such contiguous time slots given from the candidate retrieval section 22, the first decision section 23 selects a set of contiguous time slots the number of which is the smallest but not smaller than the required number (Step S4 in FIG. 4). When none of the sets of contiguous time slots meets the required number (NO at Step S5 in FIG. 4), the first decision section 23 gives a fail response to the output section 4 (Step S6 in FIG. 4). When there is at least one that meets the required number (YES at Step S5 in FIG. 4), the first decision section 23 gives the result of this selection to the second decision section 24.

From the contiguous time slots given from the first decision section 23, the second decision section 24 selects as many time slots as the required number such that the selected time slots are adjacent to an unusable time slot or any one of the time slot edge points (Step S7 in FIG. 4), and gives information about the selected time slots to the selection section 25. When the time slots cannot be adjacent to an edge point, that is, when the time slots can be adjacent only to an unusable time slot, it is necessary to examine which side of the unusable time slot the time slots should be adjacent to.

In such a case, the second decision section 24 minutely examines the unusable time slot to which the selected time slots are intended to be adjacent, to the degree of the minimum unit. For example, with reference to FIG. 2A, a case will be considered where a comparison is made between the time slot between the delimiters EX06 and EX07 and the time slot between the delimiters EX08 and EX09 when the time slot size is VC4-4c and the required number is one.

On a basis of a time slot size of VC4-4c, the segment between the delimiters EX05 and EX06 and the segment between the delimiters EX09 and EX10 are both unusable segments and are equivalent. Here, since necessity to break down the segment unit arises, the segments are further examined on a basis of a time slot size of VC4. Then, it can be found that there are three usable VC4 time slots on the left side of the delimiter EX06, and that those on the right side of the delimiter EX09 are unusable time slots. To leave as large a continuous usable area as possible after time slot selection, the second decision section 24 selects the time slot between the delimiters EX08 and EX09, not the time slot between the delimiters EX06 and EX07.

The selection section 25 selects any one of such candidates given from the second decision section 24 and gives information about the selected candidate to the output section 4. The output section 4 outputs the data link identifier and time slot numbers (or a time slot number when the required number is one) of the candidate selected by the selection section 25 (Step S8 in FIG. 4).

The TDM optical transmission device designates the data link identifier and time slot numbers given from the output section 4 and thus leaves more contiguous time slots unused. Thereby, it is possible to set up a path that satisfies the path setup request and also efficiently uses time slots.

FIG. 5 is a diagram showing time slot structure examples in the first exemplary embodiment of the present invention. FIG. 6 is a diagram showing operations of the resource allocation section 2 with respect to the time slot structures shown in FIG. 5. Operations of the present exemplary embodiment will be described by using a specific example with reference to FIGS. 5 and 6.

It is assumed that the storage section 3 stores in advance time slot structures of two data links as shown in FIG. 5 in the resource information section 31, wherein these two data links are a data link DT#Z1 and a data link DT#Z2 ("DT#Z1" and "DT#Z2" are data link identifiers).

The time slot structure of the data link DT#Z1 is as follows. The data link DT#Z1 includes time slots #A1 to #A12 as resources; the time slots #A1, #A3, #A4, and #A7 to #A12 are usable time slots; the time slots #A2, #A5, and #A6 are unusable time slots which are already used for VC4 connections.

Moreover, the time slot structure of the data link DT#Z2 is as follows. The data link DT#Z2 includes time slots #B1 to #B12 as resources; the time slots #B1, #B3 to #B7, and #B9 to #B12 are usable time slots; the time slots #B2 and #B8 are unusable time slots which are already used for VC4 connections.

Now, it is assumed that the input section 1 has received a path setup request that specifies a data link group including the data links DT#Z1 and DT#Z2 and requests to select from these two data links time slots meeting a time slot size of VC4 and a required number of three.

FIG. 6 shows an example of information input to/output from each of the resource examination section 21, candidate retrieval section 22, first decision section 23, second decision section 24, and selection section 25, in this example. In FIG. 6, "DT#Z1" and "DT#Z2" represent data link identifiers, and "TS#A1" to "TS#A12" and "TS#B1" to "TS#B12" represent time slot numbers.

Here, in Tables #TB2 and #TB3 in FIG. 6, a set of contiguous time slots is indicated by using, as components, a data link identifier, time slot size, time slot numbers, and the number of the contiguous time slots. Moreover, in Tables #TB4 and #TB5, shown are data link identifier and time slot numbers that specify a group of time slots meeting the time slot size and the required number.

The input section 1 gives the data link identifiers, time slot size, and required number to the resource examination section 21. The resource examination section 21 refers to the resource information section 31 by using the data link identifiers DT#Z1 and DT#Z2 and examines the respective time slot structures on the time slot size of VC4 and the use state of each time slot of this time slot size of VC4. The results of this examination are shown in Table #TB1 in FIG. 6. Here, in each of the data links DT#Z1 and DT#Z2, time slots whose use states are "usable" are denoted by "◯," and those whose use states are "unusable" are denoted by "×."

The candidate retrieval section 22 searches Table #TB1 shown in FIG. 6 and retrieves contiguous time slots. The results of this retrieval are as shown in Table #TB2 in FIG. 6. The first decision section 23 searches this Table #TB2, focusing attention on the number of contiguous time slots, for three (required number) or more contiguous time slots and, among sets of such contiguous time slots retrieved, selects one that is the smallest in the number of contiguous time slots (DT#Z2, TS#B9&TS#B10&TS#B11&TS#B12, number of contiguous time slots=4). The first decision section 23 gives information about the selected contiguous time slots to the second selection section 24.

From the contiguous time slots given from the first decision section 23, the second decision section 24 selects three (required number) contiguous time slots such that they are adjacent to an unusable time slot or a time slot edge point. What is selected here by the second decision section 24 is (DT#Z2, TS#B9&TS#B10&TS#B11) and (DT#Z2, TS#B10&TS#B11&TS#B12).

Here, the time slot on the left side of the time slots TS#B9 to TS#B11 is minutely examined. The time slot TS#B8 is an unusable time slot because it is being used for a band of a time slot size of VC4. Accordingly, including (DT#Z2, TS#B9&TS#B10&TS#B11) as time slots selected, the second decision section 24 gives the data link identifiers and time slot numbers, (DT#Z2, TS#B9&TS#B10&TS#B11) and (DT#Z2, TS#B10&TS#B11&TS#B12), to the selection section 25.

The selection section 25 selects any one of the groups of time slots given from the second decision section 24, that is, any one of (DT#Z2, TS#B9&TS#B10&TS#B11) and (DT#Z2, TS#B10&TS#B11&TS#B12), and gives the selected one to the output section 4.

Since output from the output section 4 are a data link identifier and time slot numbers, the output section 4 outputs (DT#Z2, TS#B9&TS#B10&TS#B11) or (DT#Z2, TS#B10&TS#B11&TS#B12) selected by the selection section 25.

In this manner, according to the present exemplary embodiment, the data link identifier and time slot numbers are selected, and the path setup function of the TDM optical transmission device sets up a path using the designated time slots.

1.5) Advantages

As described above, according to the present exemplary embodiment, time slots are selected with consideration given to the use state of each time slot in a group of data links, whereby a maximum number of contiguous usable time slots can be left. Accordingly, it is possible to efficiently use the resources.

Moreover, according to the present exemplary embodiment, as a solution to the problems mentioned earlier, even when a path is to be set up without time slots being designated under the control of an autonomous decentralized system such as a GMPLS/ASON system, it is possible to select time slots with consideration given to the use states of the resources.

Advantages of using the first exemplary embodiment of the present invention shown in FIG. 1 will be presented specifically. As described above, the present exemplary embodiment is configured to leave a maximum number of contiguous time slots available (unused) after time slots are secured. Selecting time slots in such a manner brings about the effect of preventing a state where time slots are used discretely.

2. Second Exemplary Embodiment

2.1) Device Structure

Figure 7:
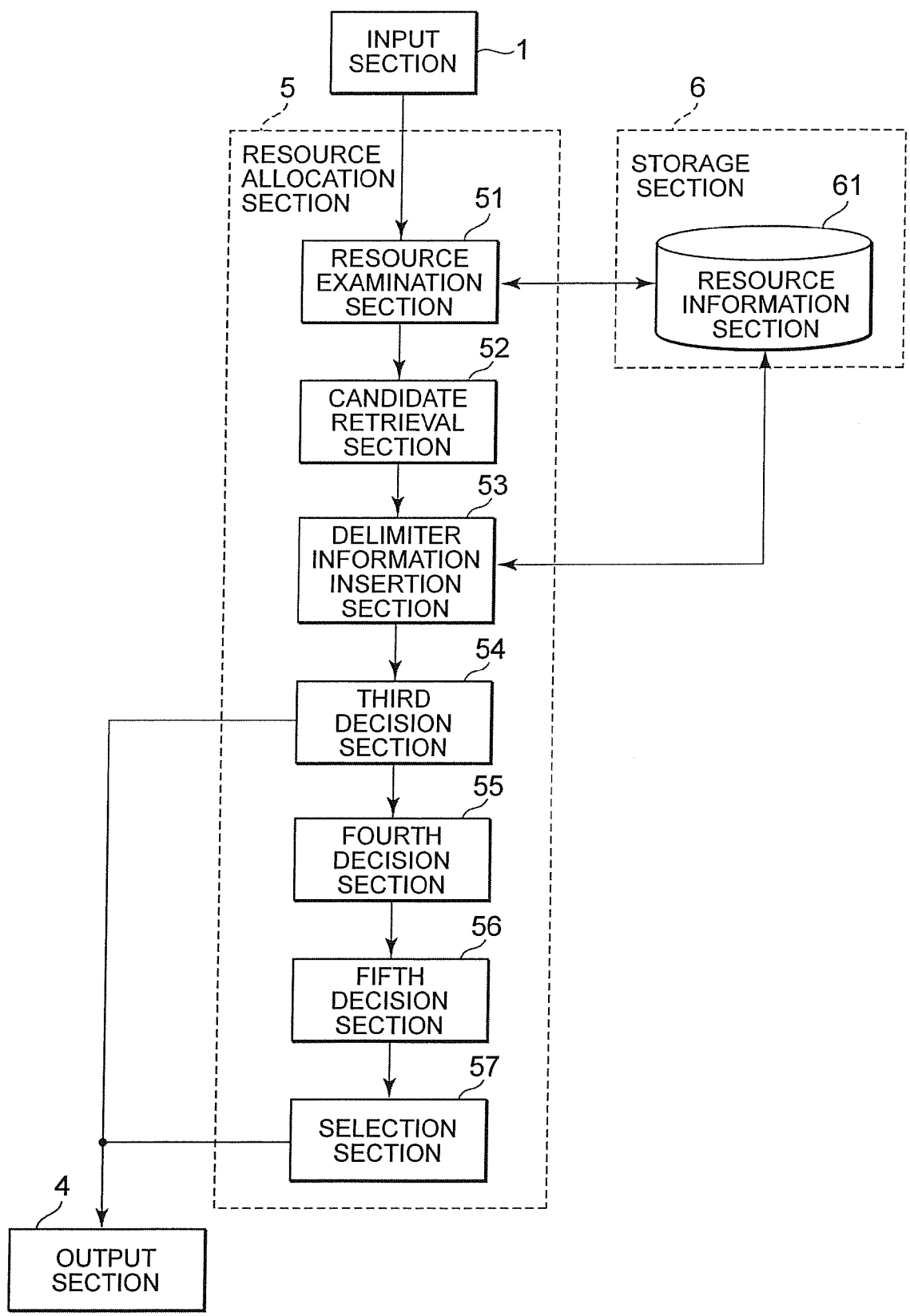
FIG. 7 is a block diagram showing an example of the configuration of a time slot selection device according to a second exemplary embodiment of the present invention.

FIG. 7 is a block diagram showing an example of the configuration of a time slot selection device according to a second exemplary embodiment of the present invention. Referring to FIG. 7, the time slot selection device according to the second exemplary embodiment of the present invention includes an input section 1, a resource allocation section 5, a storage section 6, and an output section 4. Here, the input section 1 and output section 4 are similar to those of the above-described time slot selection device according to the first exemplary embodiment shown in FIG. 1, and therefore the description thereof will be omitted.

The resource allocation section 5 includes a resource examination section 51, a candidate retrieval section 52, a delimiter information insertion section 53, a third decision section 54, a fourth decision section 55, a fifth decision section 56, and a selection section 57. The storage section 6 includes a resource information section 61. Note that the resource examination section 51, candidate retrieval section 52, and selection section 57 are similar to the resource examination section 21, candidate retrieval section 22, and selection section 25 shown in FIG. 1, respectively, and the third decision section 54 and fifth decision section 56 are similar to the first decision section 23 and second decision section 24 shown in FIG. 1, respectively.

The resource examination section 51 receives from the input section 1 a data link group (a group of data links) and a required number (the number of time slots required), examines the data link group on resource use states by referring to the resource information section 61, and gives the obtained resource use states of each data link to the candidate retrieval section 52.

The candidate retrieval section 52 retrieves contiguous usable time slots. Here, the delimiter information insertion section 53 adds delimiter information that indicates whether a segment is usable or unusable, which will be described concretely later. From among candidates thus retrieved, the third decision section 54 selects one in which the number of contiguous time slots is the smallest but not smaller than the required number.

In the selected candidate, the fourth decision section 55 selects time slots that meet the time slot size and required number that the amount of time slot segments consumed is minimized. Further from the selected time slots, the fifth decision section 56 selects time slots such that they are adjacent to a time slot edge point or an unusable time slot. The time slots selected through the above-described flow are output through the selection section 57 and output section 4.

2.2) Analysis of the First Exemplary Embodiment

Figure 8:
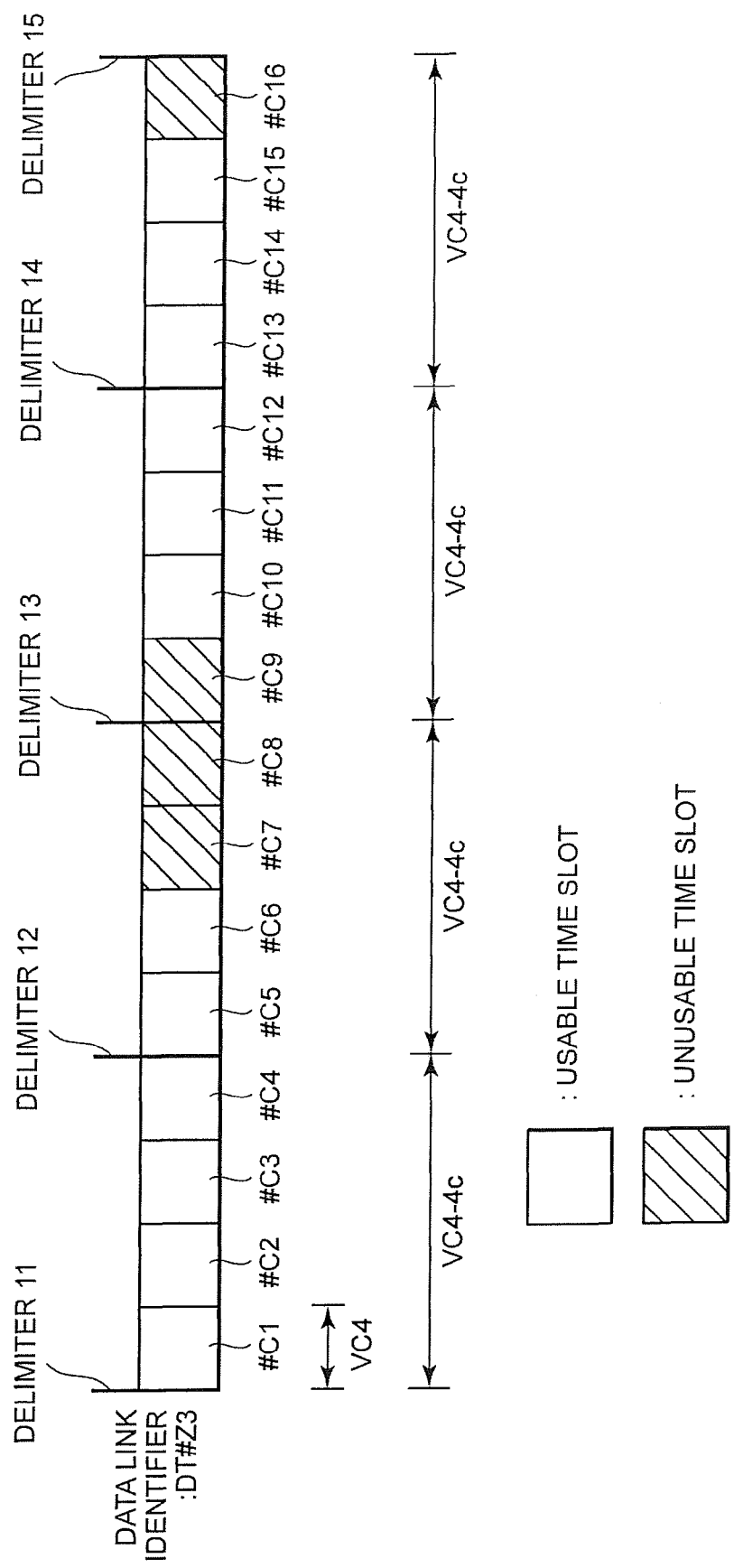
FIG. 8 is a diagram for explaining an analysis result of the first exemplary embodiment of the present invention.
Figure 9:
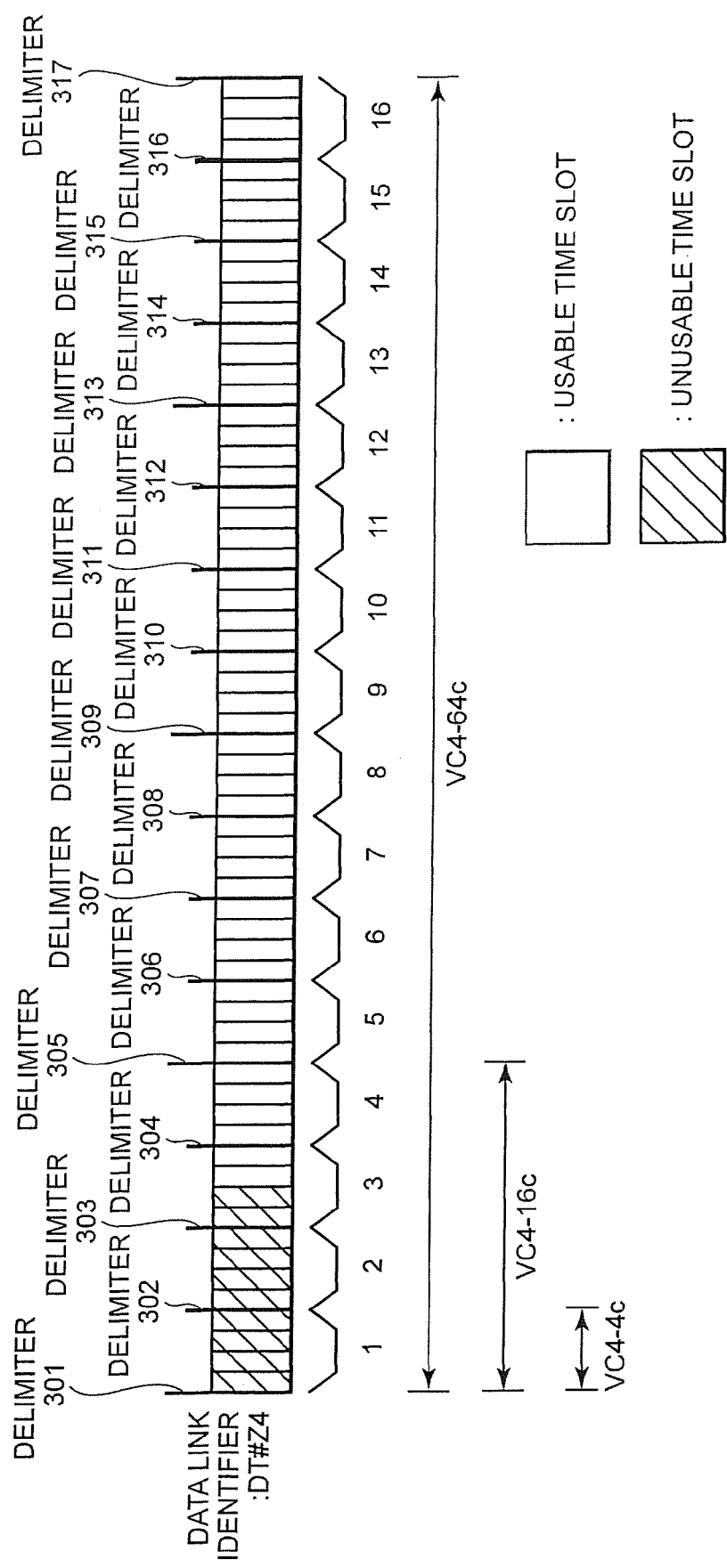
FIG. 9 is a diagram for describing analysis result of the first exemplary embodiment.

FIGS. 8 and 9 are diagrams for explaining analysis results of the first exemplary embodiment of the present invention. The method of selection by the first decision section 23 and second decision section 24 shown in FIG. 1 will be described with reference to FIGS. 8 and 9.

Referring to FIG. 8, it is assumed that the minimum time slot unit is a time slot size of VC4. Here, it is assumed that the delimiters 11, 12 13, 14, and 15 are provided for segments of a time slot size of VC4-4c. Only each one of the segments between the delimiters 11 and 12, between the delimiters 12 and 13, between the delimiters 13 and 14, and between the delimiters 14 and 15 is capable of being set as a time slot of a time slot size of VC4-4c, which cannot be set astride a delimiter.

Here, time slot selection with consideration given to a segment including a time slot in use will be described by using the example shown in FIG. 8. The data link shown in FIG. 8 includes time slots #C1 to #C16. It is assumed that the time slots #C7 to #C9 and #C16 are already used for bands of a time slot size of C4 and are unusable time slots, and that the time slots #C1 to #C6 and #C10 to #C15 are usable time slots.

A case will be considered where a path setup request specifies that the time slot size is VC4 and that the required number is six. According to the first decision section 23 and second decision section 24 shown in FIG. 1, since a set of the time slots #C1 to #C6 and a set of the time slots #C10 to #C15 include the same number of contiguous time slots, these sets of time slots are selected as equivalents.

Here, in the case where the contiguous time slots #C1 to #C6 are selected, a segment from the time slot #C1 through the time slot #C4 of these time slots provides contiguous time slots in which a time slot of a time slot size of VC4-4c can be set. On the other hand, in the time slots #C10 to #C15, a time slot of a time slot size of VC4-4c cannot be set.

As described above, a more valuable set of time slots in which a time slot of a time slot size of VC4-4c can be used is regarded as equivalent to a set of time slots in which a time slot of a time slot size of VC4-4c cannot be used. Accordingly, the first decision section 23 and second decision section 24 shown in FIG. 1 take no consideration of a segment in which a time slot can be used.

Moreover, referring to FIG. 9, it is assumed that the minimum time slot unit is a time slot size of VC4. Regarding the delimiters shown in FIG. 9, a pair of the delimiters 301 and 302 (as well as 302 & 303, 303 & 304, . . . , and 316 & 317) defines a segment of a time slot size of VC4-4c, a pair of the delimiters 301 and 305 (as well as 305 & 309, 309 & 313, and 313 & 317) defines a segment of a time slot size of VC4-16c, and a pair of the delimiters 301 and 317 defines a segment of a time slot size of VC4-64c.

Here, when the time slots in FIG. 9 are viewed on a basis of a time slot size of VC4-4c, the time slots between the delimiters 301 and 304 are unusable. However, if viewed on a basis of a time slot size of VC4, between the delimiters 303 and 304, the first two time slots #D1 and #D2 are unusable, and the latter two time slots #D3 and #D4 are usable.

A case will be considered where a path setup request specifying that the time slot size is VC4-4c and the required number is five is made with respect to this data link. Selection of the time slots between the delimiters 304 and 309 and selection of the time slots between the delimiters 312 and 317 are equivalent when the time slots are viewed on a basis of a time slot size of VC4-4c.

However, if the time slots between the delimiters 312 and 317 are selected, two time slot segments capable of allowing a time slot of a time slot size of VC4-16c to be set are consumed. When the time slots between the delimiters 304 and 309 are selected in this case, the segment between the delimiters 301 and 305 cannot be used as a time slot of a time slot size of VC4-16c already because of the unusable time slots between the delimiters 301 and 304.

Thus, only one set of contiguous time slots capable of being set as a time slot of a time slot size of VC4-16c is consumed. Time slots can be used more efficiently as more segments of a time slot size of VC4-16c, which is of greater utility, are left.

Accordingly, as in the above-described example shown in FIG. 8, the first decision section 23 and second decision section 24 shown in FIG. 1 take no consideration of a segment in which a time slot can be used.

2.3) Features of the Second Exemplary Embodiment

To overcome this problem, according to the second exemplary embodiment of the present invention, the resource allocation section 5 is provided with the delimiter information insertion section 53 and fourth decision section 55 as shown in FIG. 7. Moreover, the resource information section 61 of the storage section 6 stores in advance resource information including delimiters and the use states of segments, in addition to the information stored in the resource information section 31 shown in FIG. 1, including, for each data link, the total number of all time slots of the data link, the bandwidth per time slot, and the use state of each time slot such as whether or not the time slot is in use for another service.

The unit size of a time slot segment will be described with reference to FIG. 9. In FIG. 9, the segment between the delimiters 301 and 317 is of a time slot size of VC4-64c and the largest. Each of the segments between the delimiters 301 and 305, between the delimiters 305 and 309, between the delimiters 309 and 313, and between the delimiters 313 and 317 is of a time slot size of VC4-16c and the second largest. Each of the segments defined by the individual delimiters 301 to 317 is of a time slot size of VC4-4c and the smallest.

In addition, a time slot size of VC4-256c (not shown), which is the size of a segment composed of four contiguous segments of a time slot size of VC4-64c, is larger than the time slot size of VC4-64c. Further, to mention the consumption of a time slot segment, consumption is smaller when one segment of a time slot size of VC4-64c is consumed than when one segment of a time slot size of VC4-256c is made unusable, and consumption is smaller when one segment of a time slot size of VC4-64c is consumed than when two segments of a time slot size of VC4-64c are consumed.

The delimiter information insertion section 53 inserts, into information about contiguous time slots given from the candidate retrieval section 52, information about time slot delimiters and the use state of a segment involved in the contiguous time slots, and gives the obtained information to the third decision section 54.

The fourth decision section 55 performs time slot selection, thereby selecting time slots that least consume time slot segments.

2.4) Resource Allocation (Time Slot Selection)

Figure 10:
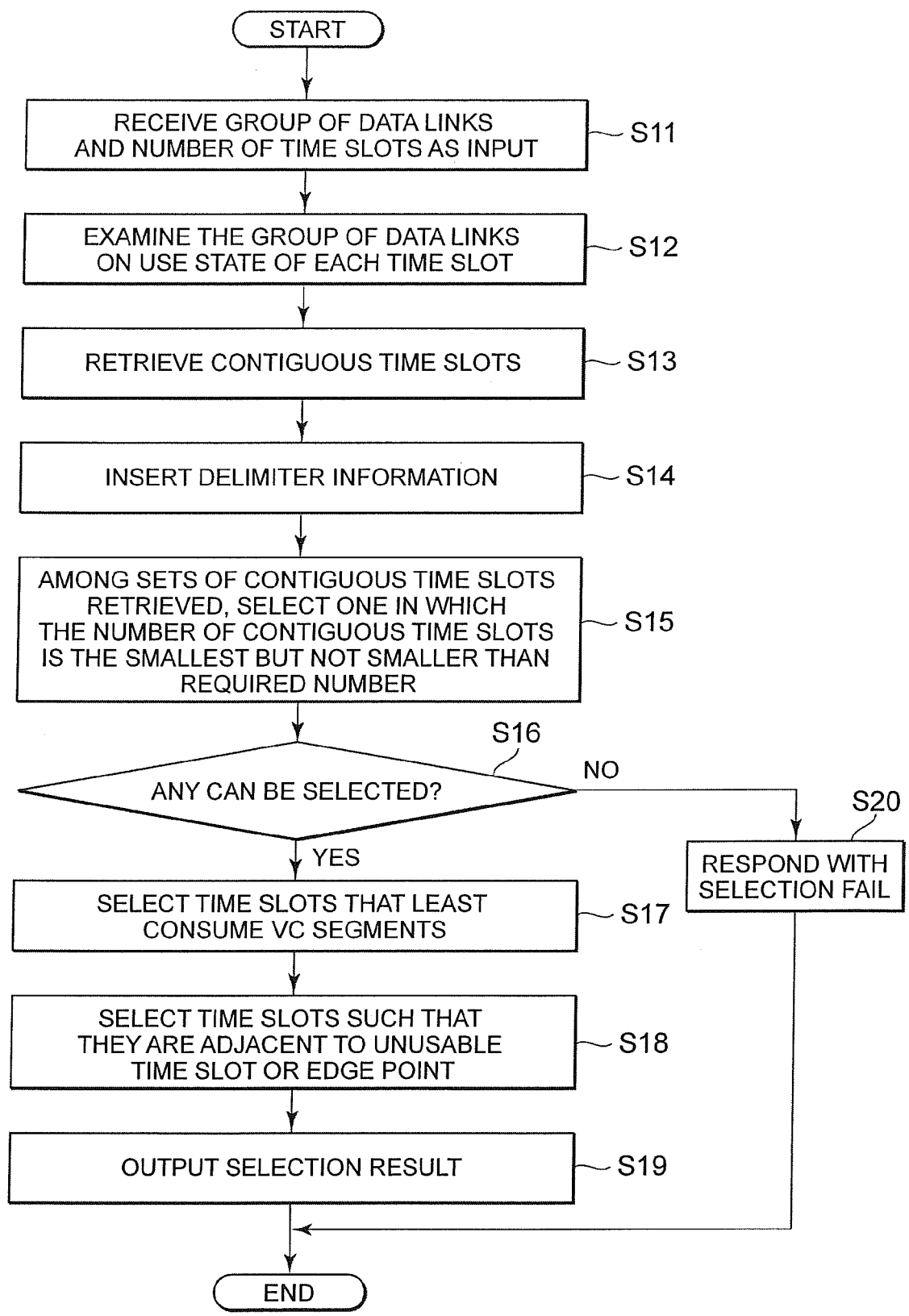
FIG. 10 is a flow chart showing operations of a resource allocation section shown in FIG. 7.

FIG. 10 is a flow chart showing operations of the resource allocation section 5 shown in FIG. 7. Operations of the time slot selection device according to the second exemplary embodiment of the present invention will be described with reference to FIGS. 7 to 10. Note that the operations shown in FIG. 10 can be implemented by causing a CPU (not shown) to carry out the processing by the resource allocation section 5 through execution of a program stored in the storage section 6. Additionally, the operations at Steps S11 to S13, S15, S16, and S18 to S20 shown in FIG. 10 are similar to those at Steps S1 to S8 shown in FIG. 4, and therefore the description thereof will be omitted.

When the delimiter information insertion section 53 is given contiguous time slot information (a data link identifier, time slot numbers, and the number of contiguous time slots) from the candidate retrieval section 52 (Step S13 in FIG. 10), the delimiter information insertion section 53 refers to the resource information section 61 and adds delimiter information to the contiguous time slot information (Step S14 in FIG. 10).

From among multiple sets of contiguous time slots, the fourth decision section 55 selects a required number of time slots that least consume time slot segments (Step S17 in FIG. 10), and gives information about the selected time slots to the fifth decision section 56. Here, the information given to the fifth decision section 56 includes the data link identifier and time slot numbers that specify the selected time slots and also includes information about a set of contiguous time slots to which the selected time slots belong.

Figure 11:
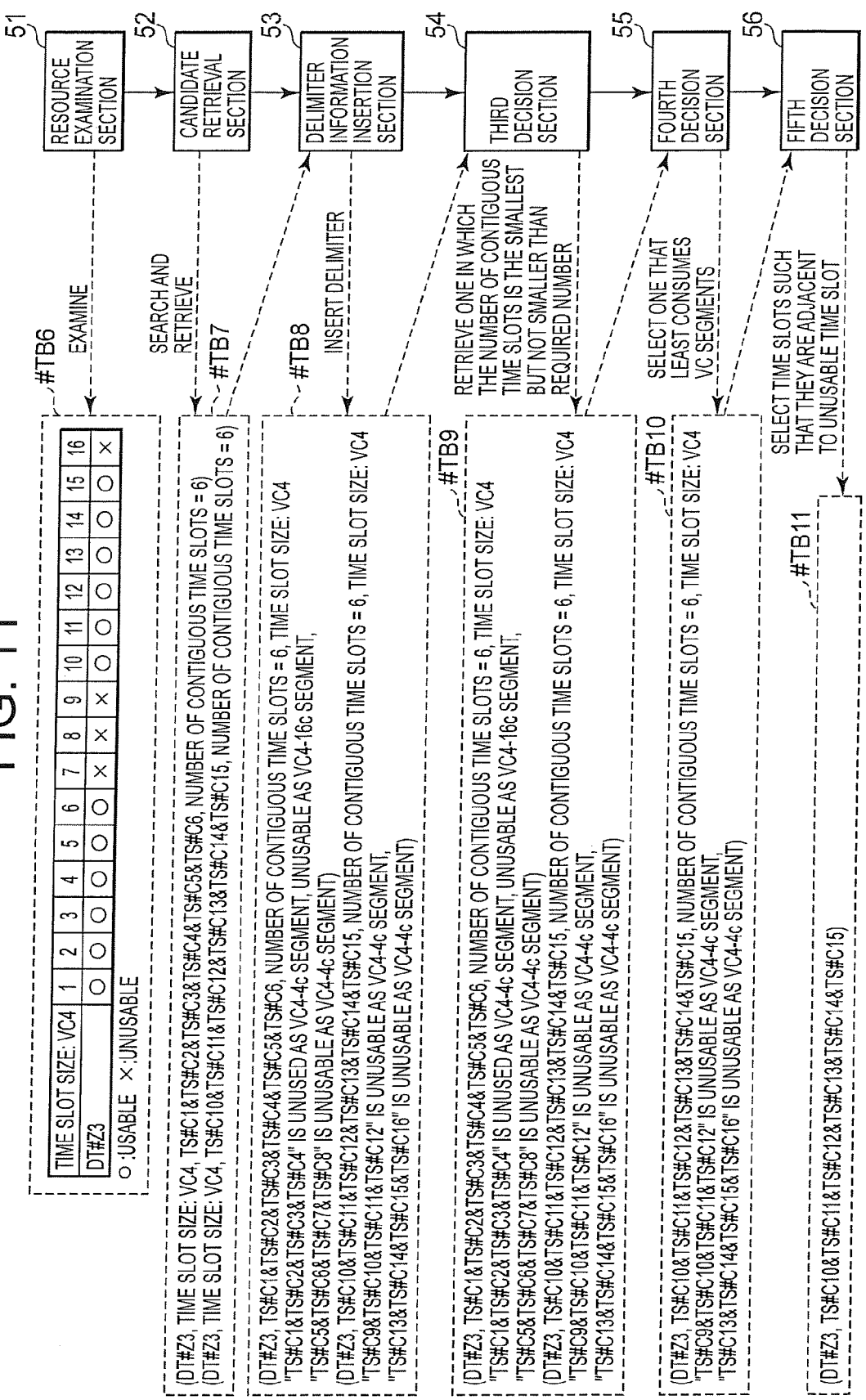
FIG. 11 is a diagram showing operations of the resource allocation section with respect to the time slot structure shown in FIG. 8.
Figure 12:
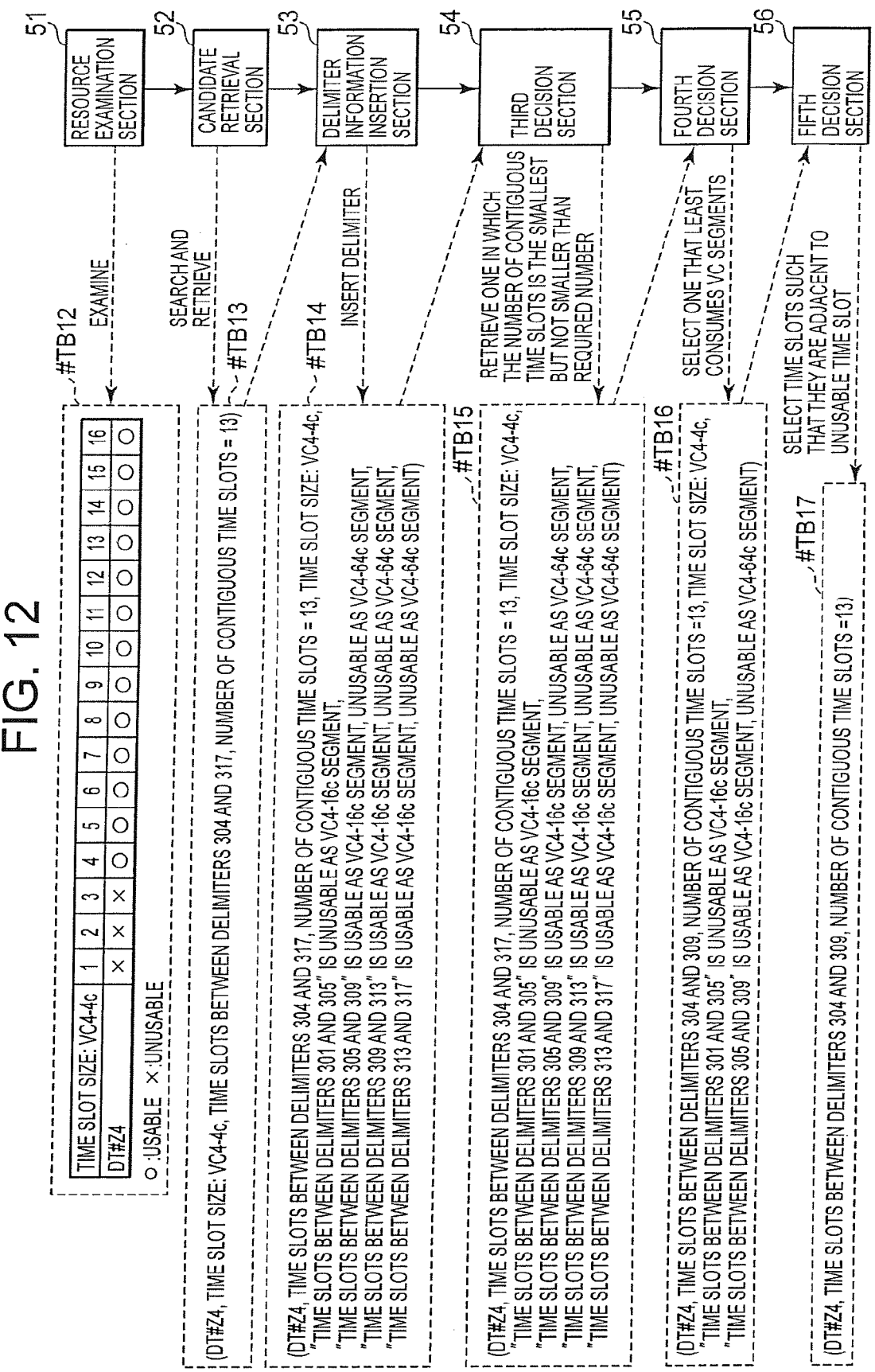
FIG. 12 is a diagram showing operations of the resource allocation section with respect to the time slot structure shown in FIG. 9.

FIG. 11 is a diagram showing operations of the resource allocation section 5 with respect to the time slot structure shown in FIG. 8. FIG. 12 is a diagram showing operations of the resource allocation section 5 with respect to the time slot structure shown in FIG. 9. FIG. 13 is a diagram showing groups of time slots that are selected as candidates by the fourth decision section 55 shown in FIG. 7. The operations of the time slot selection device according to the second exemplary embodiment of the present invention will be described more specifically with reference to FIGS. 7 and 11 to 13.

2.4.a) First Example

First, an exemplary case will be described where a path setup request specifying that the time slot size is VC4 and the required number is six is made with respect to the data link shown in FIG. 8.

The delimiter information insertion section 53 refers to the resource information section 61 and adds time slot delimiter information to contiguous time slot information given from the candidate retrieval section 52, thereby creating information about multiple sets of contiguous time slots as shown in Table #TB8 in FIG. 11.

From among the two sets of candidate contiguous time slots, (DT#Z3, TS#C1&TS#C2&TS#C3&TS#C4&TS#C5&TS#C6, number of contiguous time slots=6, time slot size: VC4, "TS#C1&TS#C2&TS#C3&TS#C4" is unused as VC4-4c segment, unusable as VC4-16c segment, "TS#C5&TS#C6&TS#C7&TS#C8" is unusable as VC4-4c segment) and (DT#Z3, TS#C10&TS#C11&TS#C12&TS#C13&TS#C14&TS#C15, number of contiguous time slots=6, time slot size: VC4, "TS#C9&TS#C10&TS#C11&TS#C12" is unusable as VC4-4c segment, "TS#C13&TS#C14&TS#C15&TS#C16" is unusable as VC4-4c segment), the third decision section 54 selects one in which the number of the contiguous time slots is the smaller but not smaller than the required number, six. In this case, since the two sets include the same number of contiguous time slots, the third decision section 53 selects both sets and gives them to the fourth decision section 55.

The fourth decision section 55, with respect to the required number, which is six, selects the time slots TS#C1 to TS#C6 and the time slots TS#C10 to TS#C15. The fourth decision section 55 compares these time slots TS#C1 to TS#C6 and time slots TS#C10 to TS#C15, with respect to the consumption of time slot segments.

If the time slots TS#C1 to TS#C6 are used, the segment of a time slot size of VC4-4c from the time slot TS#C1 through the TS#C4 is consumed. On the other hand, when the time slots TS#C10 to TS#C15 are used, consumption of a segment of a time slot size of VC4-4c or larger does not occur.

Accordingly, the fourth decision section 55 selects as a candidate the time slots TS#C10 to TS#C15 that least consume time slot segments, and gives the fifth selection section 56 the information about the candidate, (DT#Z3, TS#C10&TS#C11&TS#C12&TS#C13&TS#C14&TS#C15, number of contiguous time slots=6, time slot size: VC4, "TS#C9&TS#C10&TS#C11&TS#C12" is unusable as VC4-4c segment, "TS#C13&TS#C14&TS#C15&TS#C16" is unusable as VC4-4c segment).

If there is a plurality of candidates, the fifth decision section 56 minutely examines the use states of the time slots #C9 and #C16, which are adjacent to the time slots TS#C10 to TS#C15. However, since the time slots TS#C10 to TS#C15 only are given as a candidate here, the fifth decision section 56 selects these time slots and gives them to the selection section 57.

2.4.b) Second Example

Next, a case will be described where a path setup request specifying that the time slot size is VC4-4c and the required number is five is made with respect to the data link shown in FIG. 9. Information input to/output from the sections of the resource allocation section 5 is as shown in FIG. 12.

Contiguous time slot information is given to the third decision section 54 through the candidate retrieval section 52 and delimiter information insertion section 53. The third decision section 54 selects the contiguous time slots between the delimiters 304 and 317 and gives them to the fourth decision section 55.

The fourth decision section 55 examines, on the consumption of VC segments, groups of time slots that apply to the requested time slot size of VC4-4c and required number of five. Time slots that are listed as candidates by the fourth decision section 55 are as shown in FIG. 13.

Here, the fourth decision section 55 selects the time slots between the delimiters 304 and 309. The reason is as follows. When the time slots between the delimiters 304 and 309 are used, one usable segment of a time slot size of VC4-16c is consumed. However, when any other group of time slots is used, two segments of a time slot size of VC4-16c are consumed. Therefore, the fourth decision section 55 selects the time slots between the delimiters 304 and 309 that least consume VC segments. The result of the selection by the fourth decision section 55 is given to the fifth decision section 56.

2.5) Advantages

As described above, according to the present exemplary embodiment, from the contiguous time slots selected by the third decision section 54 shown in FIG. 7, time slots are selected with consideration given to the consumption of time slot segments which are determined depending on a time slot size equal to or larger than the time slot size requested, whereby it is possible to efficiently use time slots.

Advantages of using the second exemplary embodiment of the present invention shown in FIG. 7 will be presented specifically. In a contiguous concatenation such as VC4-xc (e.g. x=4, 16, 64, or 256), places where time slots can be set are defined by the SONET (Synchronous Optical NETwork) and SDH (Synchronous Digital Hierarchy) standards. According to the present exemplary embodiment, such time slots are left in unused states when some time slots are secured, whereby the effect is obtained that it is possible to set up a wide-band path.

3. Third Exemplary Embodiment

3.1) Device Structure

Figure 14:
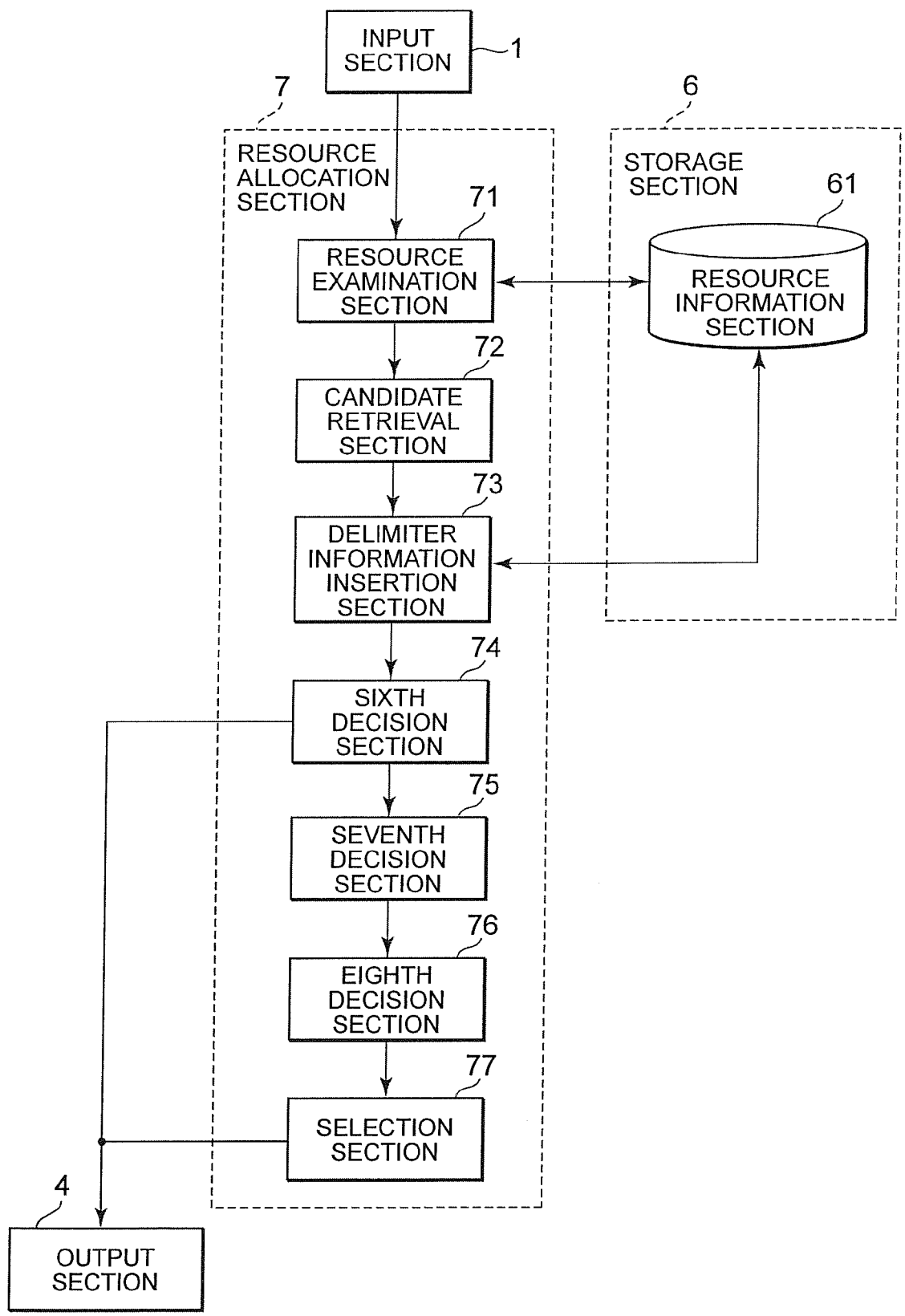
FIG. 14 is a block diagram showing an example of the configuration of a time slot selection device according to a third exemplary embodiment of the present invention.

FIG. 14 is a block diagram showing an example of configuration of a time slot selection device according to a third exemplary embodiment of the present invention. Referring to FIG. 14, the time slot selection device according to the third exemplary embodiment of the present invention includes an input section 1, a resource allocation section 7, a storage section 6, and an output section 4. Here, the input section 1, output section 4, and storage section 6 are similar to those of the above-described time slot selection device according to the second exemplary embodiment of the present invention shown in FIG. 7, and therefore the description thereof will be omitted.

The resource allocation section 7 includes a resource examination section 71, a candidate retrieval section 72, a delimiter information insertion section 73, a sixth decision section 74, a seventh decision section 75, an eighth decision section 76, and a selection section 77. Note that the resource examination section 71, candidate retrieval section 72, delimiter information insertion section 73, and selection section 77 are similar to the resource examination section 51, candidate retrieval section 52, delimiter information insertion section 53, and selection section 57 shown in FIG. 7, respectively, and that the sixth decision section 74 and eighth decision section 76 are similar to the fourth decision section 55 and fifth decision section 56 shown in FIG. 7, respectively.

In other words, according to the present exemplary embodiment, the order of the processing performed by the decision sections in the resource allocation section 7 is the sixth decision section 74 (corresponding to the fourth decision section 55 in FIG. 7), the seventh decision section 75, and the eighth decision section 76 (corresponding to the fifth decision section 56 in FIG. 7). From among sets of contiguous time slots to which groups of time slots given from the sixth decision section 74 belong, the seventh decision section 75 selects one in which the number of the contiguous time slots is the smallest, and gives the selected contiguous time slots to the eighth decision section 76.

3.2) Resource Allocation (Time Slot Selection)

Figure 15:
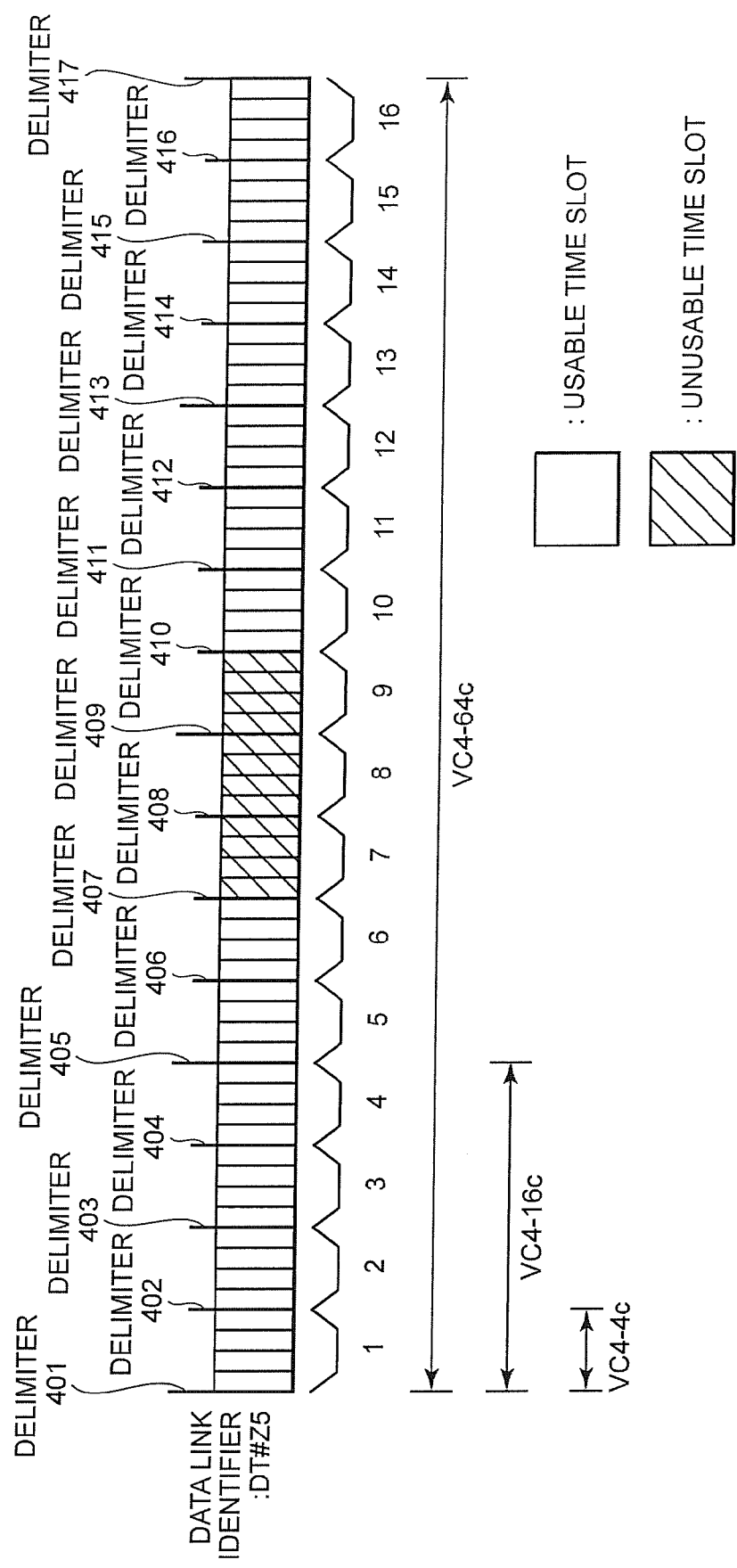
FIG. 15 is a diagram showing an example of a time slot structure in the third exemplary embodiment.
Figure 16:
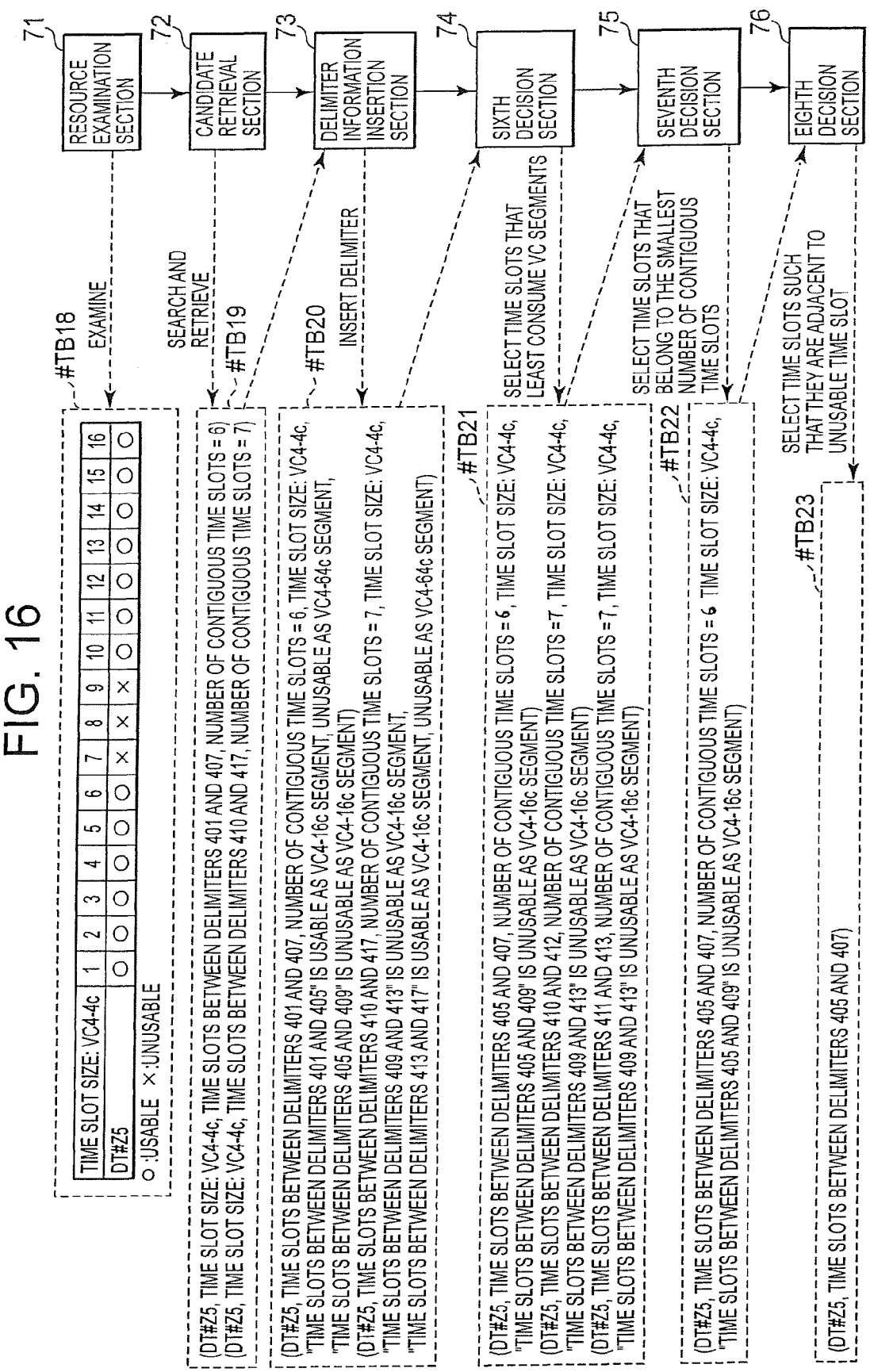
FIG. 16 is a diagram showing operations of a resource allocation section with respect to the time slot structure shown in FIG. 15.

FIG. 15 is a diagram showing an example of a time slot structure in the third exemplary embodiment of the present invention. FIG. 16 is a diagram showing operations of the resource allocation section 7 with respect to the time slot structure shown in FIG. 15. Operations of the time slot selection device according to the third exemplary embodiment of the present invention will be described with reference to FIGS. 14 to 16.

FIG. 15 shows a data link composed of 64 minimum-unit (a time slot size of VC4) time slots. It is assumed that the time slots between the delimiters 407 and 410 are unusable and the other time slots are usable. Here, it is assumed that a band that is equivalent to a time slot size of VC4-4c and a required number of two is requested.

When a path setup request specifying that the time slot size is VC4-4c and the required number is two is input from the input section 1, two sets of contiguous time slots (see Table #TB19 in FIG. 16) are detected through the processing by the resource examination section 71, candidate retrieval section 72, and the delimiter information insertion section 73, in the present exemplary embodiment.

From these contiguous time slots, the sixth decision section 74 selects time slots that meet the time slot size of VC4-4c and the required number of two. Here, comparison on the consumption of segments is made between groups of two contiguous time slots of a time slot size of VC4-4c.

The time slots between the delimiters 405 and 407, the time slots between the delimiters 410 and 412, and the time slots between the delimiters 411 and 413 consume no segment of a time slot size of VC4-16c. On the other hand, if any one of the other groups of time slots is selected, at least one time slot between the delimiters 401 and 405 or between the delimiters 413 and 417 consumes a segment of a time slot size of VC4-16c. Accordingly, the sixth decision section 74 selects the time slots between the delimiters 405 and 407, the time slots between the delimiters 410 and 412, and the time slots between the delimiters 411 and 413 (see Table #TB21 in FIG. 16).

From among the groups of time slots between the delimiters 405 and 407, between the delimiters 410 and 412, and between the delimiters 411 and 413, the seventh decision section 75 selects one that belongs to the smallest number of contiguous time slots. Concerning the number of contiguous time slots to which each group of time slots belongs, the group of time slots between the delimiters 405 and 407 belongs to six contiguous time slots, and the group of time slots between the delimiters 410 and 412 and the group of time slots between the delimiters 411 and 413 belong to seven contiguous time slots. Accordingly, the seventh decision section 75 selects the group of time slots between the delimiters 405 and 407, which belongs to the smaller number (six) of contiguous time slots (see Table #TB22 in FIG. 16).

Thus, according to the third exemplary embodiment, the time slots between the delimiters 405 and 407 are selected as a result of the processing by the eighth decision section 76, selection section 77, and output section 4.

As described above, according to the present exemplary embodiment, when time slots are selected, priority is placed on the least consumption of VC segments, whereby it is possible to flexibly handle a time slot size specified by a next new path setup request, and accordingly it is possible to efficiently use time slots.

3.3) Advantages

Next, advantages of using the third exemplary embodiment of the present invention shown in FIG. 14 will be presented specifically. In comparison with the second exemplary embodiment of the present invention shown in FIG. 7, higher priority is placed on the result that a time slot of a time slot size of VC4-xc will be able to be set than on the result that a larger number of contiguous time slots are left available. Accordingly, the present exemplary embodiment has the effect of increasing the opportunity that a wide-band path can be set up.

In other words, according to the second exemplary embodiment of the present invention shown in FIG. 7, priority is placed on obtaining the result that a larger number of contiguous unused time slots are left. On the other hand, according to the third exemplary embodiment of the present invention shown in FIG. 14, priority is placed on obtaining the result that time slot segments are least consumed.

4. Fourth Exemplary Embodiment

Figure 17:
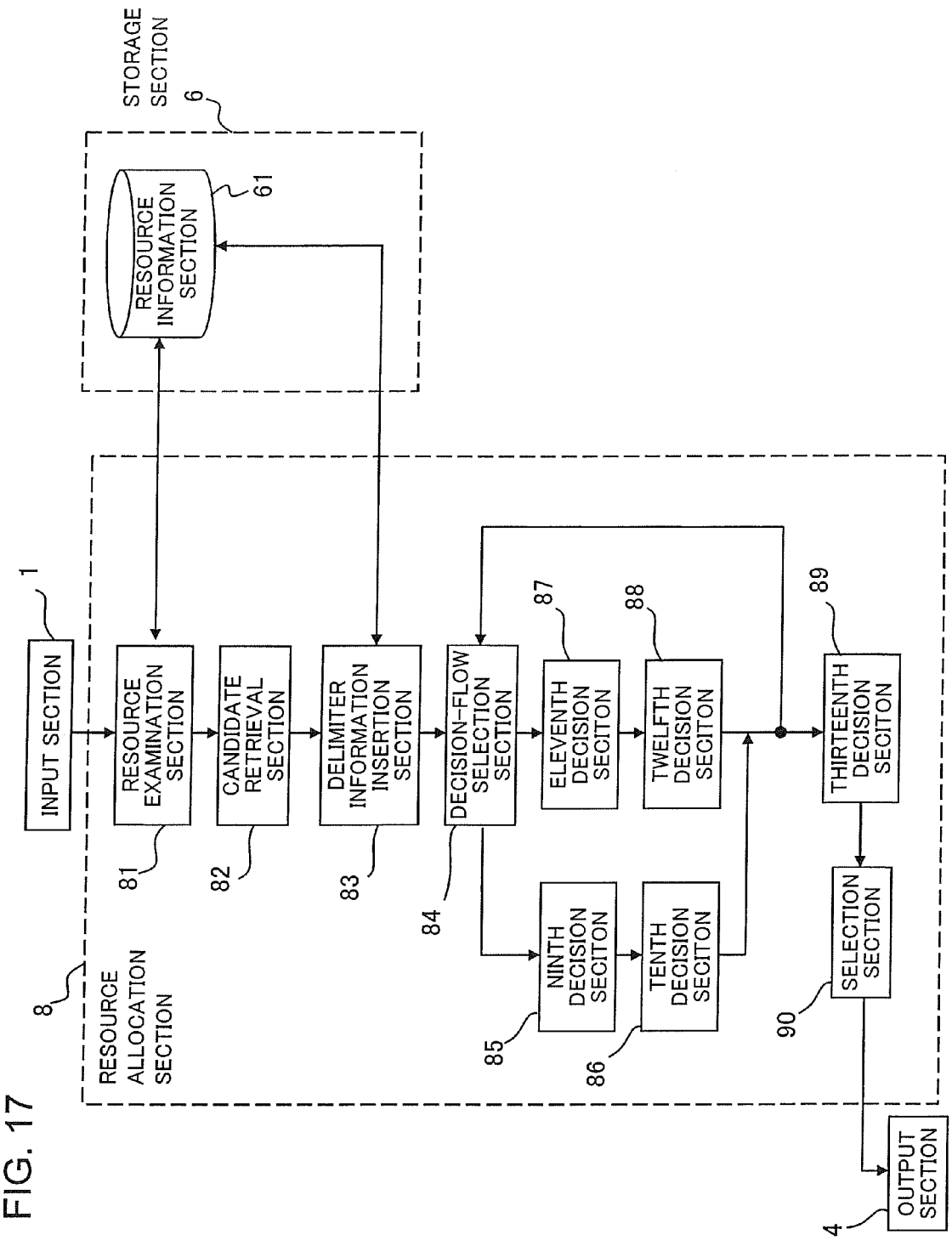
FIG. 17 is a block diagram showing an example of the configuration of a time slot selection device according to a fourth exemplary embodiment of the present invention.

FIG. 17 is a block diagram showing an example of the configuration of a time slot selection device according to a fourth exemplary embodiment of the present invention. Referring to FIG. 17, the time slot selection device according to the fourth exemplary embodiment of the present invention includes an input section 1, a resource allocation section 8, a storage section 6, and an output section 4. Here, the input section 1, output section 4, and storage section 6 are similar to those of the above-described time slot selection device according to the second exemplary embodiment of the present invention shown in FIG. 7, and therefore the description thereof will be omitted.

The resource allocation section 8 includes a resource examination section 81, a candidate retrieval section 82, a delimiter information insertion section 83, a decision-flow selection section 84, a ninth decision section 85, a tenth decision section 86, an eleventh decision section 87, a twelfth decision section 88, a thirteenth decision section 89, and a selection section 90. Note that the resource examination section 81, candidate retrieval section 82, delimiter information insertion section 83, and selection section 90 are similar to the resource examination section 51, candidate retrieval section 52, delimiter information insertion section 53, and selection section 57 shown in FIG. 7, respectively. Moreover, the ninth decision section 85 and tenth decision section 86 are similar to the third decision section 54 and fourth decision section 55 shown in FIG. 7, respectively, and the eleventh decision section 87 and twelfth decision section 88 are similar to the sixth decision section 74 (or fourth decision section 55 shown in FIG. 7) and seventh decision section 75 shown in FIG. 14, respectively. The thirteenth decision section 89 is similar to the fifth decision section 56 shown in FIG. 7 (or eighth decision section 76 shown in FIG. 14).

According to the fourth exemplary embodiment of the present invention, there are two flows: a first flow of the ninth decision section 85 and tenth decision section 86; and a second flow of eleventh decision section 87 and twelfth decision section 88. The decision-flow selection section 84 obtains information on consumed VC segment(s) and the number of contiguous available slots from the results of slot selection by respective ones of the first and second flows and compares these results to determine which is better according to user-defined policy.

The fourth exemplary embodiment of the present invention is provided with a function of assigning processing either to the decision sections for performing time slot selection according to the second exemplary embodiment of the present invention shown in FIG. 7 or to the decision sections for performing time slot selection according to the third exemplary embodiment of the present invention shown in FIG. 14, based on the setting made by a user. Here, the setting made by a user (user setting or user-defined policy) will be described below.

According to the user setting, the assignment of processing to any one of the first and second flows is controlled through the decision-flow selection section 84, taking into account VC segment to be consumed and the number of contiguous available time slots to be left. For example, normally, a setting is made such that the first flow performed by the ninth decision section 85 and tenth decision section 86 is selected so as to leave a larger number of contiguous available time slots. However, if a segment of a time slot size of VC4-16c is consumed, the second flow is selected so that time slot selection will be performed by the eleventh decision section 87 and twelfth decision section 88.

In the present exemplary embodiment, when a time slot size and required number are input from the input section 1, contiguous time slots are detected through the processing by the resource examination section 81, candidate retrieval section 82, and delimiter information insertion section 83.

Here, the first flow on the ninth decision section 85 and tenth decision section 86 will be referred to as a flow-1, and the second flow on the eleventh decision section 87 and twelfth decision section 88 will be referred to as a flow-2.

The decision-flow selection section 84 determines which one of the decision flows should be given the time slot size, required number, and contiguous time slots to perform time slot selection. In the user setting, conditions for performing time slot selection through the flow-1 and conditions for performing time slot selection through the flow-2 are stored in advance in the decision-flow selection section 84, whereby it is possible to switch between these decision flows.

When a candidate is selected upon the completion of the processing through the flow-1 (or flow-2), the candidate time slots are given to the thirteenth decision section 89, selection section 90, and output section 4, which are common sections between the second exemplary embodiment shown in FIG. 7 and the third exemplary embodiment shown in FIG. 14. Thus, the time slot selection is complete.

As described above, in respect to the efficient use of time slots, time slot selection is performed with consideration given to priority on obtaining the result that a larger number of contiguous usable time slots are left in the second exemplary embodiment shown in FIG. 7, and with consideration given to priority on obtaining the result that VC segments are least consumed in the third exemplary embodiment shown in FIG. 14. However, according to the fourth exemplary embodiment of the present invention, the processing of time slot selection can be assigned either to the decision flow-1 so that a result as in the second exemplary embodiment will be obtained, or to the decision flow-2 so that a result as in the third exemplary embodiment will be obtained. Thereby, it is possible to perform the efficient allocation of time slots more flexibly than in the second exemplary embodiment shown in FIG. 7 and the third exemplary embodiment shown in FIG. 14.

Advantages of using the fourth exemplary embodiment of the present invention shown in FIG. 17 will be presented specifically. The present exemplary embodiment can obtain the effect that it is possible to assign processing to one of time slot selection methods in conformity with user policy by setting a threshold value of the number of contiguous time slots or the VC segment to be consumed.

5. Fifth Exemplary Embodiment

Figure 18:
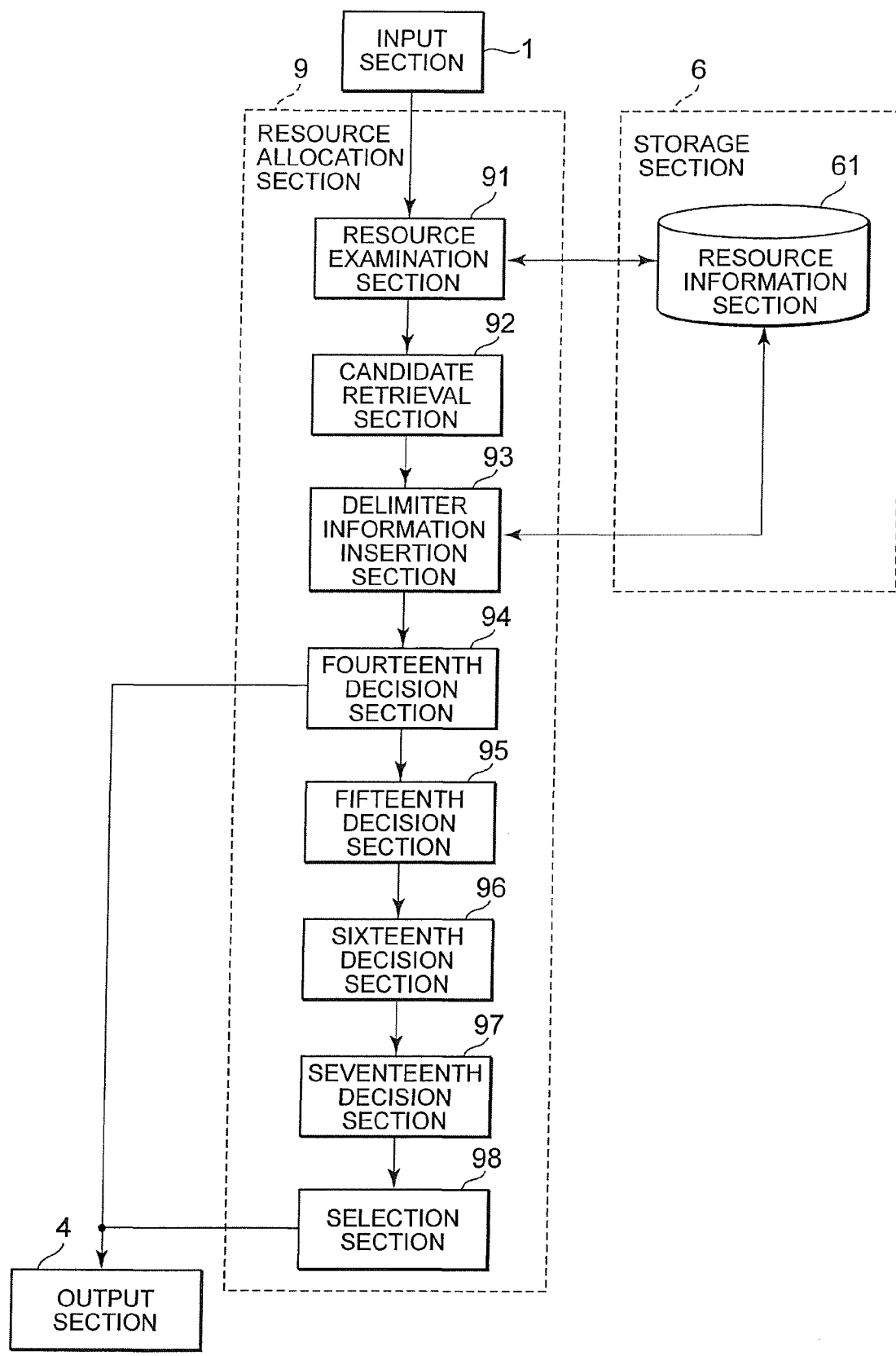
FIG. 18 is a block diagram showing an example of the configuration of a time slot selection device according to a fifth exemplary embodiment of the present invention.

FIG. 18 is a block diagram showing an example of the configuration of a time slot selection device according to a fifth exemplary embodiment of the present invention. Referring to FIG. 18, the time slot selection device according to the fifth exemplary embodiment of the present invention includes an input section 1, a resource allocation section 9, a storage section 6, and an output section 4. Here, the input section 1, output section 4, and storage section 6 are similar to those of the above-described time slot selection device according to the second exemplary embodiment of the present invention shown in FIG. 7, and therefore the description thereof will be omitted.

The resource allocation section 9 includes a resource examination section 91, a candidate retrieval section 92, a delimiter information insertion section 93, a fourteenth decision section 94, a fifteenth decision section 95, a sixteenth decision section 96, a seventeenth decision section 97, and a selection section 98. Note that the resource examination section 91, candidate retrieval section 92, delimiter information insertion section 93, and selection section 98 are similar to the resource examination section 51, candidate retrieval section 52, delimiter information insertion section 53, and selection section 57 shown in FIG. 7, respectively, and that the fourteenth decision section 94, fifteenth decision section 95, and seventeenth decision section 97 are similar to the third decision section 54, fourth decision section 55, and fifth decision section 56 shown in FIG. 7, respectively. According to the present exemplary embodiment, the sixteenth decision section 96 is additionally provided between the fifteenth decision section 95 and seventeenth decision section 97 in the resource allocation section 9, and information to be handled by the resource examination section 91 is added.

The resource examination section 91 has data link band information. The data link band information is about the total sum of bands, regardless of in use or unused, that a data link has, that is, the band that the data link originally has in the initial state.

The sixteenth decision section 96, from among given time slot candidates, preferentially selects a time slot candidate belonging to a data link that has the smallest data link band. As an operation example, the fifth exemplary embodiment is different from the second exemplary embodiment in the points that each time slot candidate has a data link band and that the sixteenth decision section 96 selects one of time slot candidates based on the data link band.

Advantages of using the fifth exemplary embodiment of the present invention shown in FIG. 18 will be presented specifically. According to the present exemplary embodiment, if time slots belonging to a data link having a smaller data link band is preferentially selected when time slot selection is performed, the chance that a wide band can be used is increased when a set-up path is released. This has the same meaning that a link having a wider data link band is more highly valued.

6. Sixth Exemplary Embodiment

Figure 19:
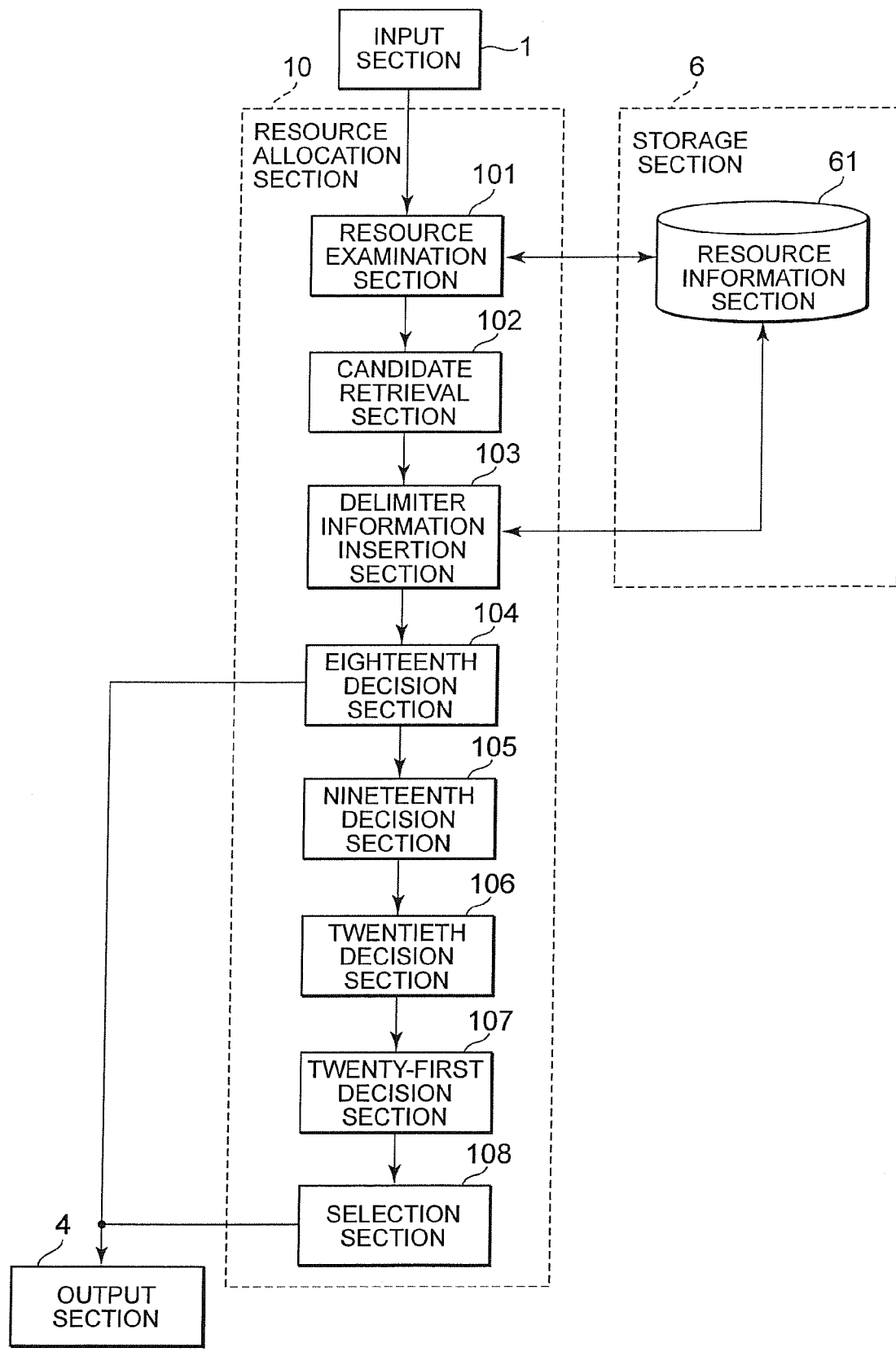
FIG. 19 is a block diagram showing an example of the configuration of a time slot selection device according to a sixth exemplary embodiment of the present invention.

FIG. 19 is a block diagram showing an example of the configuration of a time slot selection device according to a sixth exemplary embodiment of the present invention. Referring to FIG. 19, the time slot selection device according to the sixth exemplary embodiment of the present invention includes an input section 1, a resource allocation section 10, a storage section 6, and an output section 4. Here, the input section 1, output section 4, and storage section 6 are similar to those of the above-described time slot selection device according to the second exemplary embodiment of the present invention shown in FIG. 7, and therefore the description thereof will be omitted.

The resource allocation section 10 includes a resource examination section 101, a candidate retrieval section 102, a delimiter information insertion section 103, an eighteenth decision section 104, a nineteenth decision section 105, a twentieth decision section 106, a twenty-first decision section 107, and a selection section 108. Note that the resource examination section 101, candidate retrieval section 102, delimiter information insertion section 103, and selection section 108 are similar to the resource examination section 51, candidate retrieval section 52, delimiter information insertion section 53, and selection section 57 shown in FIG. 7, respectively, and that the eighteenth decision section 104, nineteenth decision section 105, and twenty-first decision section 107 are similar to the third decision section 54, fourth decision section 55, and fifth decision section 56 shown in FIG. 7, respectively. According to the present exemplary embodiment, the twentieth decision section 106 is provided between the nineteenth decision section 105 and twenty-first decision section 107 in the resource allocation section 10.

The twentieth decision section 106, from among given time slot candidates, preferentially selects one in which the selected time slots are astride a delimiter involved in a smaller contiguous concatenation. As an operation example, the sixth exemplary embodiment of the present invention is different from the second exemplary embodiment of the present invention in the point that the twentieth decision section 106 selects a time slot candidate with consideration given to contiguous concatenation delimiters.

Advantages of using the sixth exemplary embodiment of the present invention shown in FIG. 19 will be presented specifically. According to the present exemplary embodiment, if time slots are set astride a delimiter involved in a large contiguous concatenation when time slot selection is performed, a chance of using a wide band is decreased until the set-up path is released. For example, if contiguous time slots are set astride a delimiter between segments of a time slot size of VC4-16c, these two segments of a time slot size of VC4-16c cannot be used as time slots of a time slot size of VC4-16c until this path is released.

As described above, the sixth exemplary embodiment has the advantage that the chance that a wider-band path service can be offered can be increased by performing the above time slot selection.

The present invention can be applied to an optical transmission device for transmitting optical signals according to Time Division Multiplexing scheme.

The present invention can be applied to an optical transmission network system including the optical transmission device.

The present invention may be embodied in other specific forms without departing from the spirit or essential characteristics thereof. The above-described exemplary embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A device for selecting time slots from a resource based on a path setup request according to an autonomous decentralized protocol, wherein the path setup request includes a data link identifier identifying at least one data link, a time slot size and a requested number of time slots, wherein the requested number of time slots is one of a plurality of predetermined numbers of time slots according to the predetermined autonomous decentralized protocol, the device comprising:
a resource allocation section for selecting the time slots based on a use state of the resource;
and a memory previously storing resource information which is retrievable using the data link identifier as a key, wherein the resource information includes the use state of the resource and a total sum of time slots including usable and unusable time slots for each data link, wherein the use state of the resource of each data link indicates whether each time slot is already used by another service,
wherein the resource allocation section comprises:
a resource examination section for examining the use state of the resource for each data link by searching the memory based on the data link identifier and the requested number of time slots;
a candidate retrieval section for extracting an available set of contiguous time slots as a candidate based on an examination result of the resource examination section;
and a decision section for selecting the time slots so as to maximize an available set of contiguous time slots of the resource to leave as large a predetermined number of time slots as possible after time slot selection based on the use state of the resource for each identified data link by referring to the time slot size and the requested number of time slots of the path setup request, wherein the time slot size is a predetermined integral multiple of a size of each time slot;
wherein the decision section comprises:
a first decision section for selecting a first candidate from candidates extracted by the candidate retrieval section, wherein the first candidate has a smallest number of time slots among the candidates but not smaller than the requested number of time slots;
and a second decision section for selecting a second candidate as the time slots from first candidates selected by the first decision section, wherein the second candidate is adjacent to an unusable time slot or an edge point of the resource.

2. The device according to claim 1, wherein the decision section comprises:
a third decision section for selecting a third candidate from candidates extracted by the candidate retrieval section, wherein the third candidate has a smallest number of time slots among the candidates but not smaller than the requested number of time slots;
a fourth decision section for selecting a fourth candidate from third candidates selected by the third decision section, wherein the fourth candidate meets the time slot size and the requested number of time slots and least consumes time slot segments which are determined by delimiting the resource depending on a time slot size equal to or larger than the time slot size requested; and
a fifth decision section for selecting a fifth candidate as the time slots from fourth candidates selected by the fourth decision section, wherein the fifth candidate is adjacent to an unusable time slot or an edge point of the resource.

3. The device according to claim 1, wherein the decision section comprises:
a sixth decision section for selecting a sixth candidate from candidates extracted by the candidate retrieval section, wherein the sixth candidate meets the time slot size and the requested number of time slots and least consumes time slot segments which are determined by delimiting the resource depending on a time slot size equal to or larger than the time slot size requested;
a seventh decision section for selecting a seventh candidate from sixth candidates selected by the sixth decision section, wherein the seventh candidate has a smallest number of contiguous time slots; and
an eighth decision section for selecting an eighth candidate as the time slots from seventh candidates selected by the seventh decision section, wherein the eighth candidate is adjacent to an unusable time slot or an edge point of the resource.

4. The device according to claim 1, wherein the decision section comprises:
a decision-flow selection section for selecting one of a first decision flow and a second decision flow depending on the use state of the resource and user's setting information, wherein
the first decision flow selects a first-flow candidate from candidates extracted by the candidate retrieval section so as to obtain a larger number of contiguous usable time slots, and
the second decision flow selects a second-flow candidate from candidates extracted by the candidate retrieval section so as to least consume time slot segments which are determined by delimiting the resource depending on a time slot size equal to or larger than the time slot size requested;

a thirteenth decision section for selecting a thirteenth candidate as the time slots from candidates selected by a selected one of the first decision flow and the second decision flow, wherein the thirteenth candidate is adjacent to an unusable time slot or an edge point of the resource.

5. The device according to claim 4, wherein the first decision flow includes:
a ninth decision section for selecting a ninth candidate from the candidates extracted by the candidate retrieval section, wherein the ninth candidate has a smallest number of time slots among the candidates but not smaller than the requested number of time slots; and
a tenth decision section for selecting a tenth candidate as the first-flow candidate from ninth candidates selected by the ninth decision section, wherein the tenth candidate meets the time slot size and the requested number of time slots and least consumes time slot segments which are determined by delimiting the resource depending on a time slot size equal to or larger than the time slot size requested, and the second decision flow includes:
an eleventh decision section for selecting an eleventh candidate from the candidates extracted by the candidate retrieval section, wherein the eleventh candidate meets the time slot size and the requested number of time slots and least consumes time slot segments which are determined by delimiting the resource depending on a time slot size equal to or larger than the time slot size requested; and
a twelfth decision section for selecting a twelfth candidate as the second-flow candidate from eleventh candidates selected by the eleventh decision section, wherein the twelfth candidate has a smallest number of contiguous time slots.

6. The device according to claim 1, wherein the decision section comprises:
a fourteenth decision section for selecting a fourteenth candidate from candidates extracted by the candidate retrieval section, wherein the fourteenth candidate has a smallest number of time slots among the candidates but not smaller than the requested number of time slots;
a fifteenth decision section for selecting a fifteenth candidate from fourteenth candidates selected by the fourteenth decision section, wherein the fifteenth candidate meets the time slot size and the requested number of time slots and least consumes time slot segments which are determined by delimiting the resource depending on a time slot size equal to or larger than the time slot size requested;
a sixteenth decision section for selecting a sixteenth candidate from fifteenth candidates selected by the fifteenth decision section, wherein the sixteenth candidate has a smallest data link band; and
a seventeenth decision section for selecting a seventeenth candidate as the time slots from sixteenth candidates selected by the sixteenth decision section, wherein the seventeenth candidate is adjacent to an unusable time slot or an edge point of the resource.

7. The device according to claim 1, wherein the decision section comprises:
an eighteenth decision section for selecting a eighteenth candidate from candidates extracted by the candidate retrieval section, wherein the eighteenth candidate has a smallest number of time slots among the candidates but not smaller than the requested number of time slots;
a nineteenth decision section for selecting a nineteenth candidate from eighteenth candidates selected by the eighteenth decision section, wherein the nineteenth candidate meets the time slot size and the requested number of time slots and least consumes time slot segments which are determined by delimiting the resource depending on a time slot size equal to or larger than the time slot size requested;
a twentieth decision section for preferentially selecting a twentieth candidate from nineteenth candidates selected by the nineteenth decision section, wherein the twentieth candidate is astride a delimiter involved in a smaller contiguous concatenation; and
a twenty-first decision section for selecting a twenty-first candidate as the time slots from twentieth candidates selected by the twentieth decision section, wherein the twenty-first candidate is adjacent to an unusable time slot or an edge point of the resource.

8. An optical transmission device for transmitting optical signals according to Time Division Multiplexing scheme using time slots selected by the device according to claim 1.

9. An optical transmission network system comprising the optical transmission device according to claim 8.

10. A method for selecting time slots from a resource based on a path setup request according to an autonomous decentralized protocol, wherein the path setup request includes a data link identifier identifying at least one data link, a time slot size and a requested number of time slots, wherein the requested number of time slots is one of a plurality of predetermined numbers of time slots according to the predetermined autonomous decentralized protocol, the method comprising:
a) selecting the time slots based on a use state of the resource;
previously storing resource information in a memory, wherein the resource information is retrievable using the data link identifier as a key and includes the use state of the resource and a total sum of time slots including usable and unusable time slots for each data link, wherein the use state of the resource of each data link indicates whether each time slot is already used by another service;
examining the use state of the resource for each data link by searching the memory based on the data link identifier and the requested number of time slots;
and extracting an available set of contiguous time slots as a candidate based on an examination result,
wherein the a) selecting the time slots comprises:
selecting the time slots so as to maximize an available set of contiguous time slots of the resource to leave as large a predetermined number of time slots as possible after time slot selection based on the use state of the resource for each identified data link by referring to the time slots size and the requested number of time slots of the path setup request, wherein the time slot size is a predetermined integral multiple of a size of each time slot;
selecting a first candidate from candidates extracted, wherein the first candidate has a smallest number of time slots among the candidates but not smaller than the requested number of time slots;
and selecting a second candidate as the time slots from first candidates selected, wherein the second candidate is adjacent to an unusable time slot or an edge point of the resource.

11. The method according to claim 10, wherein the a) further comprises:
- selecting a third candidate from candidates extracted, wherein the third candidate has a smallest number of time slots among the candidates but not smaller than the requested number of time slots;
- selecting a fourth candidate from third candidates selected, wherein the fourth candidate meets the time slot size and the requested number of time slots and least consumes time slot segments which are determined by delimiting the resource depending on a time slot size equal to or larger than the time slot size requested; and
- selecting a fifth candidate as the time slots from fourth candidates selected, wherein the fifth candidate is adjacent to an unusable time slot or an edge point of the resource.

12. The method according to claim 10, wherein the a) further comprises:
- selecting a sixth candidate from candidates extracted, wherein the sixth candidate meets the time slot size and the requested number of time slots and least consumes time slot segments which are determined by delimiting the resource depending on a time slot size equal to or larger than the time slot size requested;
- selecting a seventh candidate from sixth candidates selected, wherein the seventh candidate has a smallest number of contiguous time slots; and
- selecting an eighth candidate as the time slots from seventh candidates selected, wherein the eighth candidate is adjacent to an unusable time slot or an edge point of the resource.

13. The method according to claim 10, wherein the a) further comprises:
- selecting one of a first decision flow and a second decision flow depending on the use state of the resource and user's setting information, wherein
- the first decision flow selects a first-flow candidate from candidates extracted so as to obtain a larger number of contiguous usable time slots, and
- the second decision flow selects a second-flow candidate from candidates extracted so as to least consume time slot segments which are determined by delimiting the resource depending on a time slot size equal to or larger than the time slot size requested;
- selecting a thirteenth candidate as the time slots from candidates selected by a selected one of the first decision flow and the second decision flow, wherein the thirteenth candidate is adjacent to an unusable time slot or an edge point of the resource.

14. The method according to claim 13, wherein the first decision flow comprises:
- selecting a ninth candidate from the candidates extracted, wherein the ninth candidate has a smallest number of time slots among the candidates but not smaller than the requested number of time slots; and
- selecting a tenth candidate as the first-flow candidate from ninth candidates selected, wherein the tenth candidate meets the time slot size and the requested number of time slots and least consumes time slot segments which are determined by delimiting the resource depending on a time slot size equal to or larger than the time slot size requested, and
the second decision flow comprises:
- selecting an eleventh candidate from the candidates extracted, wherein the eleventh candidate meets the time slot size and the requested number of time slots and least consumes time slot segments which are determined by delimiting the resource depending on a time slot size equal to or larger than the time slot size requested; and
- selecting a twelfth candidate as the second-flow candidate from eleventh candidates selected, wherein the twelfth candidate has a smallest number of contiguous time slots.

15. The method according to claim 10, wherein the a) further comprises:
- selecting a fourteenth candidate from candidates extracted, wherein the fourteenth candidate has a smallest number of time slots among the candidates but not smaller than the requested number of time slots;
- selecting a fifteenth candidate from fourteenth candidates selected, wherein the fifteenth candidate meets the time slot size and the requested number of time slots and least consumes time slot segments which are determined by delimiting the resource depending on a time slot size equal to or larger than the time slot size requested;
- selecting a sixteenth candidate from fifteenth candidates selected, wherein the sixteenth candidate has a smallest data link band; and
- selecting a seventeenth candidate as the time slots from sixteenth candidates selected, wherein the seventeenth candidate is adjacent to an unusable time slot or an edge point of the resource.

16. The method according to claim 10, wherein the a) further comprises:
- selecting a eighteenth candidate from candidates extracted, wherein the eighteenth candidate has a smallest number of time slots among the candidates but not smaller than the requested number of time slots;
- selecting a nineteenth candidate from eighteenth candidates selected, wherein the nineteenth candidate meets the time slot size and the requested number of time slots and least consumes time slot segments which are determined by delimiting the resource depending on a time slot size equal to or larger than the time slot size requested;
- preferentially selecting a twentieth candidate from nineteenth candidates selected, wherein the twentieth candidate is astride a delimiter involved in a smaller contiguous concatenation; and
- selecting a twenty-first candidate as the time slots from twentieth candidates selected, wherein the twenty-first candidate is adjacent to an unusable time slot or an edge point of the resource.

17. A non-transitory computer-readable storage medium storing a computer-readable program instructing a computer to select time slots from a resource based on a path setup request according to an autonomous decentralized protocol, wherein the path setup request includes a data link identifier identifying at least one data link, a time slot size and a requested number of time slots, wherein the requested number of time slots is one of a plurality of predetermined numbers of time slots according to the predetermined autonomous decentralized protocol, the program comprising:
- a) selecting the time slots based on a use state of the resource;
- previously storing resource information in a memory, wherein the resource information is retrievable using the data link identifier as a key and includes the use state of the resource and a total sum of time slots including usable and unusable time slots for each data link, wherein the use state of the resource of each data link indicates whether each time slot is already used by another service;

examining the use state of the resource for each data link by searching the memory based on the data link identifier and the requested number of time slots; and extracting an available set of contiguous time slots as a candidate based on an examination result, wherein the a) selecting the time slots comprises: selecting the time slots so as to maximize an available set of contiguous time slots of the resource to leave as large a predetermined number of time slots as possible after time slot selection based on the use state of the resource for each identified data link by referring to the time slots size and the requested number of time slots of the path setup request, wherein the time slot size is a predetermined integral multiple of a size of each time slot;

selecting a first candidate from candidates extracted, wherein the first candidate has a smallest number of time slots among the candidates but not smaller than the requested number of time slots;

and selecting a second candidate as the time slots from first candidates selected, wherein the second candidate is adjacent to an unusable time slot or an edge point of the resource.

* * * * *